(12) United States Patent
Naruse et al.

(10) Patent No.: US 8,936,747 B2
(45) Date of Patent: Jan. 20, 2015

(54) HONEYCOMB STRUCTURE AND METHOD FOR MANUFACTURING THE SAME

(75) Inventors: Kazuya Naruse, Ibi-gun (JP); Tomohiro Takano, Ibi-gun (JP); Hideki Sugino, Ibi-gun (JP)

(73) Assignee: Ibiden Co., Ltd., Ogaki-shi (JP)

( * ) Notice: Subject to any disclaimer, the term of this patent is extended or adjusted under 35 U.S.C. 154(b) by 854 days.

(21) Appl. No.: 13/094,843

(22) Filed: Apr. 27, 2011

(65) Prior Publication Data
US 2011/0262691 A1 Oct. 27, 2011

(30) Foreign Application Priority Data
Apr. 27, 2010 (WO) .................. PCT/JP2010/057503

(51) Int. Cl.
*B28B 1/00* (2006.01)
*C04B 35/565* (2006.01)
*C04B 37/00* (2006.01)
(Continued)

(52) U.S. Cl.
CPC .............. *B28B 1/002* (2013.01); *C04B 35/565* (2013.01); *C04B 37/005* (2013.01); *C04B 37/025* (2013.01); *F01N 3/0222* (2013.01); *C04B 2235/3826* (2013.01); *C04B 2235/5436* (2013.01); *C04B 2235/5445* (2013.01); *C04B 2235/5472* (2013.01); *C04B 2237/083* (2013.01); *C04B 2237/365* (2013.01);
(Continued)

(58) Field of Classification Search
CPC  B28B 3/269; B28B 2003/203; C04B 37/001; C04B 37/003; C04B 37/005; C04B 37/008

USPC ................................................ 264/630, 631
See application file for complete search history.

(56) References Cited

U.S. PATENT DOCUMENTS 5,914,187 A * 6/1999 Naruse et al. ................. 428/327
2009/0220735 A1 9/2009 Mizuno et al.
(Continued)

FOREIGN PATENT DOCUMENTS

EP  1698604  9/2006
EP  1834936  9/2007
(Continued)

OTHER PUBLICATIONS

International Search Report for corresponding International Application No. PCT/JP2010/057503, Jul. 20, 2010.

*Primary Examiner* — Joseph S Del Sole
*Assistant Examiner* — Russell Kemmerle, III
(74) *Attorney, Agent, or Firm* — Mori & Ward, LLP

(57) ABSTRACT

A method for manufacturing a honeycomb structure includes extrusion-molding honeycomb molded bodies. The honeycomb molded bodies are fired to form honeycomb fired bodies. A molding frame optionally having a vent portion with air permeability is provided. The honeycomb fired bodies are fixed in the molding frame. A member having an other vent portion with air permeability is optionally disposed on an inner face side of the molding frame. A gap between the honeycomb fired bodies and a gap between the molding frame and the honeycomb fired bodies are filled with a sealing material paste. The sealing material paste includes inorganic particles and/or inorganic fibers. The sealing material paste is dried to solidify the sealing material paste and to form an adhesive layer and a coat layer. The sealing material paste is in contact with at least a part of the vent portion during the drying.

40 Claims, 16 Drawing Sheets

(51) Int. Cl.
*C04B 37/02* (2006.01)
*F01N 3/022* (2006.01)

(52) U.S. Cl.
CPC ...... *C04B 2237/406* (2013.01); *C04B 2237/72* (2013.01); *F01N 2330/06* (2013.01); *Y02T 10/20* (2013.01)
USPC .......................................................... 264/630

(56) References Cited

U.S. PATENT DOCUMENTS

| | | | | |
|---|---|---|---|---|
| 2011/0229684 A1* | 9/2011 | Naruse et al. | ................. | 428/116 |
| 2011/0230335 A1* | 9/2011 | Yamada et al. | ............... | 502/100 |
| 2011/0236624 A1* | 9/2011 | Saito et al. | ................... | 428/116 |
| 2011/0236626 A1* | 9/2011 | Saito et al. | ................... | 428/116 |
| 2011/0237427 A1* | 9/2011 | Saito et al. | ................... | 502/100 |

FOREIGN PATENT DOCUMENTS

| | | |
|---|---|---|
| EP | 1977808 | 10/2008 |
| EP | 1997791 | 12/2008 |
| JP | 2008-307525 | 12/2008 |
| WO | WO 2005/047210 | 5/2005 |
| WO | WO 2007/096986 | 8/2007 |
| WO | WO 2008/126334 | 10/2008 |
| WO | WO 2008/139608 | 11/2008 |
| WO | WO 2009/022015 | 2/2009 |

* cited by examiner

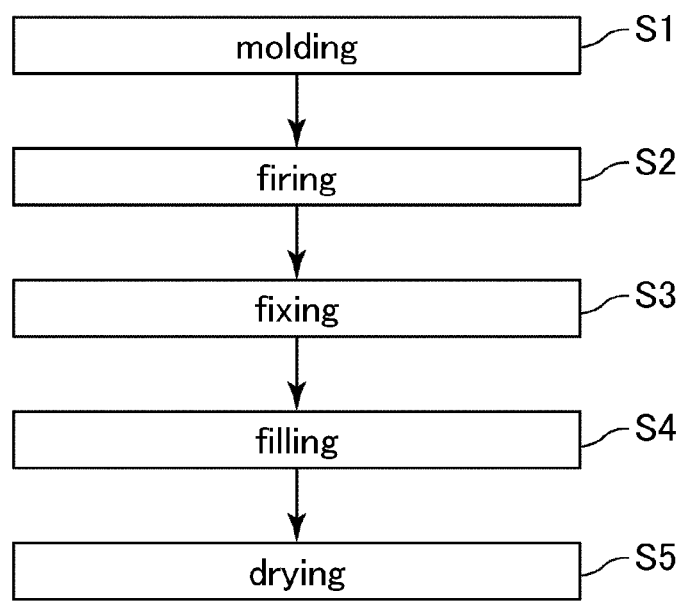

HONEYCOMB STRUCTURE AND METHOD FOR MANUFACTURING THE SAME

CROSS-REFERENCE TO RELATED APPLICATIONS

The present application claims priority under 35 U.S.C. §119 to International Application No. PCT/JP 2010/057503, filed Apr. 27, 2010, the contents of which are incorporated herein by reference in their entirety.

BACKGROUND OF THE INVENTION

1. Field of the Invention

The present invention relates to a method for manufacturing a honeycomb structure, and a honeycomb structure.

2. Discussion of the Background

There has been known, as an exhaust gas-purifying filter or a catalyst supporting carrier, a honeycomb structure formed by combining a plurality of pillar-shaped honeycomb fired bodies each having a large number of cells longitudinally placed in parallel with one another. The honeycomb structure includes a ceramic block formed by the honeycomb fired bodies and a coat layer disposed on the periphery of the ceramic block. The ceramic block is formed by fixing a plurality of the pillar-shaped honeycomb fired bodies to one another by interposing an adhesive layer that is formed on the side surfaces of the honeycomb fired bodies.

As a method for manufacturing the honeycomb structure, there has been known a method in which the adhesive layer and the coat layer are formed in separate steps. In this method, firstly, a plurality of honeycomb fired bodies are bonded to one another with a sealing material paste, and then this sealing material paste is dried and solidified to form an adhesive layer. Thus, a ceramic block formed by the honeycomb fired bodies firmly bonded to one another can be manufactured. Next, a sealing material paste is applied to the periphery of the ceramic block, and then is dried and solidified to form a coat layer. Thus, a honeycomb structure is manufactured.

In the above method, however, the adhesive layer and the coat layer are formed in the separate steps, and as a result, an interface that divides the adhesive layer from the coat layer is formed between the two layers. When such a honeycomb structure is used as, for example, an exhaust-gas purifying filter for vehicles, the honeycomb structure is exposed to rapid increase in temperature at the beginning of driving, experiences long-term repeat of heat cycle from driving of a vehicle and regeneration of the filter, and the like. As a result of this, the honeycomb structure tends to be separated or broken at the interface between the adhesive layer and the coat layer.

WO 2008/126334 A1, WO 2008/139608 A1, and WO 2005/047210 A1 each disclose a method for integrally forming an adhesive layer and a coat layer with no interface that divides the two layers. Specifically, in the methods of WO 2008/126334 A1 and WO 2008/139608 A1, firstly, a plurality of honeycomb fired bodies are combined into a specific shape in such a manner to maintain a constant spacing with one another using an assembling apparatus, and this shape is fixed with a molding frame. Next, a sealing material paste is filled into gaps between the honeycomb fired bodies and a gap between the molding frame and the honeycomb fired bodies. Then, this sealing material paste is dried and solidified, and thus the adhesive layer and the coat layer are integrally formed with no interface that divides the two layers. WO 2005/047210 A1 discloses a method in which upon combining honeycomb fired bodies into a specific shape, the honeycomb fired bodies are kept at regular spaces using a spacing member, and an adhesive layer and a coat layer are integrally formed using a molding frame.

The contents of WO 2008/126334 A1, WO 2008/139608 A1, and WO 2005/047210 A1 are incorporated herein by reference in their entirety.

SUMMARY OF THE INVENTION

According to one aspect of the present invention, a method for manufacturing a honeycomb structure includes extrusion-molding honeycomb molded bodies each having cell walls extending along a longitudinal direction of the honeycomb molded bodies to define cells. The cell walls include a peripheral cell wall formed at a peripheral portion of the honeycomb molded bodies. The honeycomb molded bodies are fired to form pillar-shaped honeycomb fired bodies. A molding frame optionally having a vent portion with air permeability is provided. The honeycomb fired bodies are fixed in the molding frame or are fixed in the molding frame to form an other vent portion with air permeability on an inner face of the molding frame. A member having an other vent portion with air permeability is optionally disposed on an inner face side of the molding frame. A gap between the honeycomb fired bodies and a gap between the molding frame and the honeycomb fired bodies are filled with a sealing material paste. The sealing material paste includes inorganic particles and/or inorganic fibers. The sealing material paste is dried to solidify the sealing material paste and to form an adhesive layer between the honeycomb fired bodies and a coat layer on a periphery of a ceramic block. The sealing material paste is in contact with at least a part of the vent portion during the drying. The ceramic block is formed by the honeycomb fired bodies combined with one another with the adhesive layer.

According to another aspect of the present invention, a honeycomb structure includes a ceramic block and a coat layer. The ceramic block includes a plurality of pillar-shaped honeycomb fired bodies and an adhesive layer. The plurality of honeycomb fired bodies each have cell walls extending along a longitudinal direction of the honeycomb fired bodies to define cells. The adhesive layer is interposed between the honeycomb fired bodies to combine the honeycomb fired bodies. The adhesive layer includes inorganic particles and/or inorganic fibers. The coat layer is formed on a periphery of the ceramic block and includes the inorganic particles and/or the inorganic fibers. The adhesive layer and the coat layer are integrally formed and have no interface that divides the adhesive layer from the coat layer. A proportion of the inorganic particles present or a proportion of the inorganic fibers present in a surface side of the coat layer is substantially equal to a proportion of the inorganic particles present or a proportion of the inorganic fibers present in a ceramic block side of the coat layer, respectively.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 is a flow chart of a method for manufacturing the honeycomb structure of the first embodiment of the present invention;

DESCRIPTION OF THE EMBODIMENTS

Figure 1:
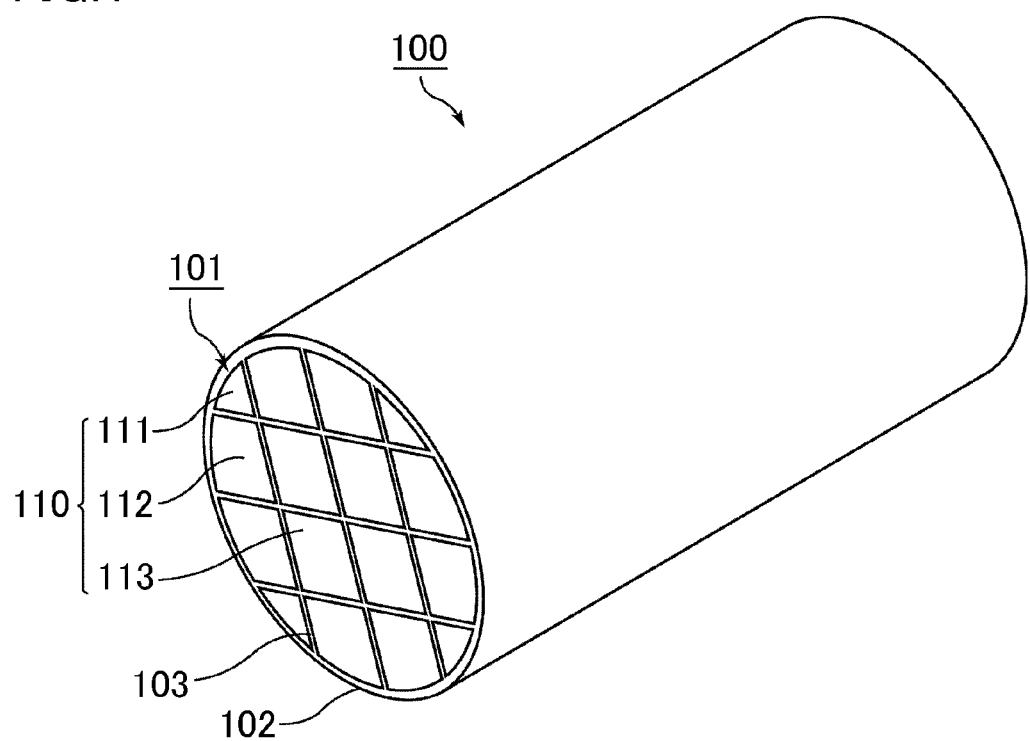
FIG. 1 is a perspective view schematically illustrating one example of a honeycomb structure of a first embodiment of the present invention.

The embodiments will now be described with reference to the accompanying drawings, wherein like reference numerals designate corresponding or identical elements throughout the various drawings.

A method for manufacturing a honeycomb structure according to embodiments of the present invention is a method for manufacturing a honeycomb structure including: a ceramic block formed by a plurality of pillar-shaped honeycomb fired bodies combined with one another with an adhesive layer interposed therebetween, each of the honeycomb fired bodies having a large number of cells placed in parallel with one another in a longitudinal direction with a cell wall therebetween; and a coat layer formed on a periphery of the ceramic block, the method including:

extrusion-molding honeycomb molded bodies including a cell wall formed in a peripheral portion thereof;

firing the honeycomb molded bodies to form honeycomb fired bodies;

fixing a plurality of the honeycomb fired bodies in the molding frame;

filling a sealing material paste into a gap between the molding frame and the honeycomb fired bodies and a gap between the honeycomb fired bodies; and drying and solidifying the sealing material paste to form the adhesive layer and the coat layer, wherein the sealing material paste contains inorganic particles and/or inorganic fibers, the molding frame, an inner face of the molding frame, or a member disposed on an inner face side of the molding frame includes a vent portion with air permeability, and in the drying, the sealing material paste is dried and solidified while the sealing material paste is in contact with at least part of the vent portion.

According to the above manufacturing method, in the drying, after moisture contained in the sealing material paste becomes steam, air containing the steam is discharged into the outside through the vent portion as well as pores formed in the honeycomb fired bodies. Specifically, moisture contained in the sealing material paste that forms the coat layer moves not only to the honeycomb fired body side but also to the vent portion side, and this tends to reduce bias of movement to the honeycomb fired body side of moisture, and as a result, occurrence of migration of the inorganic fibers and/or inorganic particles contained in the sealing material paste tends to be suppressed. The obtained coat layer has entirely uniform strength and has excellent surface strength.

In the method for manufacturing the honeycomb structure according to the embodiments of the present invention, the molding frame is desirably any one of a molding frame made of a dense metal, a molding frame made of a porous metal, and a molding frame made of a dense metal including a plurality of recessed portions and/or projective portions formed on an inner face thereof.

A member including a vent portion with air permeability is disposed on an inner face side of the molding frame made of a dense metal.

In the molding frame made of a porous metal, the molding frame itself includes a vent portion and has air permeability. In the method for manufacturing the honeycomb structure according to the embodiments of the present invention, a member including a vent portion with air permeability is further disposed on the inner face side of a molding frame made of a porous metal.

In the molding frame made of a dense metal including a plurality of recessed portions and/or projective portions formed on the inner face thereof, the molding frame itself has no air permeability. However, when spaces are formed by the recessed portions and/or projective portions upon filling the sealing material paste into a gap between the molding frame and the honeycomb fired bodies, these spaces can be used as a vent portion. Namely, in the molding frame made of a dense metal including a plurality of recessed portions and/or projective portions formed on the inner face thereof, an inner face of the molding frame includes a vent portion with air permeability. In this case, a member including a vent portion with air permeability may be further disposed on the inner face side of the molding frame.

In the method for manufacturing the honeycomb structure according to the embodiments of the present invention, the member including the vent portion disposed on an inner face side of the molding frame desirably includes at least one selected from a paper member, a nonwoven fabric member, a mesh member, porous resin layer, and porous carbon layer. These may be singly used, or may configure a vent portion in combination with two or more of them.

In the method for manufacturing the honeycomb structure according to the embodiments of the present invention, the vent portion desirably has an average pore diameter of about 0.1 μm to about 50 μm.

The vent portion with such an average pore diameter tends to ensure air permeability while suppressing migration of the inorganic particles and/or the inorganic fibers contained in the sealing material paste.

In the method for manufacturing the honeycomb structure according to the embodiments of the present invention, the molding frame or the member disposed on an inner face side of the molding frame desirably has an air permeability of about 0.05 cc/cm$^2$/sec or more.

The molding frame or the member including the vent portion with such air permeability tends to eliminate migration of the inorganic particles and/or the inorganic fibers contained in the sealing material paste.

In the method for manufacturing the honeycomb structure according to the embodiments of the present invention, both the molding frame and the member disposed on the inner face side of the molding frame desirably include the vent portion, the molding frame is desirably made of a porous metal, and the member is desirably a paper member or nonwoven fabric member. In this case, air permeability tends to be provided by the porous metal and the paper member or nonwoven fabric member, and when the paper member or nonwoven fabric member is in contact with the sealing material paste, better frame-releasability is shown upon release of the honeycomb structure. Further, when the air permeability and frame-releasability of the paper member or nonwoven fabric member are deteriorated by, for example, adhesion of the sealing material paste, the paper member or nonwoven fabric member can be easily replaced.

In the method for manufacturing the honeycomb structure according to the embodiments of the present invention, the member disposed on the inner face side of the molding frame desirably includes the vent portion, the member is desirably a paper member or nonwoven fabric member, and the molding frame is desirably made of a dense metal. In this case, air permeability tends to be provided by the paper member or nonwoven fabric member, and further better frame-releasability tends to be shown upon release of the honeycomb structure when the paper member or nonwoven fabric member is in contact with the sealing material paste. Further, when the air permeability and frame-releasability of the paper member or nonwoven fabric member are deteriorated by, for example, adhesion of the sealing material paste, the paper member or nonwoven fabric member can be easily replaced.

In the method for manufacturing the honeycomb structure according to the embodiments of the present invention, the paper member is desirably a silicon-treated paper member.

In the present description, the silicon-treated paper member means a paper member such as craft paper and glassine paper, the surface of which has been coated with a silicone resin material, or with which a silicone resin material has been impregnated. The silicon-treated paper member such as craft paper and glassine paper can be easily separated from a dried and solidified sealing material paste.

In the method for manufacturing the honeycomb structure according to the embodiments of the present invention, the vent portion of a silicon-treated part desirably has an average pore diameter of about 20 μm to about 50 μm.

In the method for manufacturing the honeycomb structure according to the embodiments of the present invention, the porous metal or the dense metal, constituting the molding frame, is desirably copper, nickel, stainless steel, or an alloy containing at least one of copper, nickel, and stainless steel.

In the method for manufacturing the honeycomb structure according to the embodiments of the present invention, the nonwoven fabric member is desirably a polyester nonwoven fabric member containing polyester fibers.

In the method for manufacturing the honeycomb structure according to the embodiments of the present invention, the porous resin layer desirably includes at least one selected from fluorine resins and polypropylene.

In the method for manufacturing the honeycomb structure according to the embodiments of the present invention, the molding frame is desirably separable into a plurality of members, and in the fixing, the plurality of members are desirably integrated together to be used.

In the method for manufacturing the honeycomb structure according to the embodiments of the present invention, in the fixing, a plurality of the honeycomb fired bodies are desirably fixed using a spacing member that keeps the honeycomb fired bodies at regular spaces.

In the method for manufacturing the honeycomb structure according to the embodiments of the present invention, in the fixing, both end faces of each of the honeycomb fired bodies are desirably held to fix the honeycomb fired bodies. In this case, the honeycomb fired bodies can be kept in a specific shape easily.

In the method for manufacturing the honeycomb structure according to the embodiments of the present invention, in the drying, the sealing material paste is desirably dried and solidified in such a manner that a proportion of the inorganic particles present or a proportion of the inorganic fibers present in a surface side of the coat layer is substantially equal to that in a ceramic block side of the coat layer. This allows manufacturing a honeycomb structure in which the entire coat layer strength is uniform, the coat layer surface strength tends to be high because irregularities are less likely to be formed by unevenly dispersed inorganic particles and/or inorganic fibers, and the coat layer tends to have a non-floury surface.

In the present description, the expression "a proportion of the inorganic particles present or a proportion of the inorganic fibers present in a surface side of the coat layer is substantially equal to that in a ceramic block side of the coat layer" means the following:

When the sealing material paste contains only inorganic particles out of inorganic particles and inorganic fibers, the expression "a proportion of the inorganic particles present or a proportion of the inorganic fibers present in a surface side of the coat layer is substantially equal to that in a ceramic block side of the coat layer" means a proportion of the inorganic particles present in a surface side of the coat layer is substantially equal to a proportion of the inorganic particles present in a ceramic block side of the coat layer.

When the sealing material paste contains only inorganic fibers out of inorganic particles and inorganic fibers, "a proportion of the inorganic particles present or a proportion of the inorganic fibers present in a surface side of the coat layer is substantially equal to that in a ceramic block side of the coat layer" means a proportion of the inorganic fibers present in a surface side of the coat layer is substantially equal to a proportion of the inorganic fibers present in a ceramic block side of the coat layer.

Further, when the sealing material paste contains both inorganic particles and inorganic fibers, the expression "a proportion of the inorganic particles present or a proportion of the inorganic fibers present in a surface side of the coat layer is substantially equal to that in a ceramic block side of the coat layer" implies that a proportion of the inorganic particles present in a surface side of the coat layer is substantially equal to a proportion of the inorganic particles present in a ceramic block side of the coat layer, and a proportion of the inorganic fibers present in a surface side of the coat layer is substantially equal to a proportion of the inorganic fibers present in a ceramic block side of the coat layer.

The expression "a proportion of the inorganic particles present in a surface side of the coat layer is 'substantially equal' to a proportion of the inorganic particles present in a ceramic block side of the coat layer" means that "a proportion of the inorganic particles present in a surface side of the coat layer" is 80% to 120% of "a proportion of the inorganic particles present in a ceramic block side of the coat layer". "The proportion of the inorganic particles present in a surface side of the coat layer" is desirably 90% to 110%, more desirably 95% to 105%, and still more desirably 99% to 101%, of "the proportion of the inorganic particles present in a ceramic block side of the coat layer".

The expression "a proportion of the inorganic fibers present in a surface side of the coat layer is 'substantially equal' to a proportion of the inorganic fibers present in a ceramic block side of the coat layer" means that "a proportion of the inorganic fibers present in a surface side of the coat layer" is 80% to 120% of "a proportion of the inorganic fibers present in a ceramic block side of the coat layer". "The proportion of the inorganic fibers present in a surface side of the coat layer" is more desirably 90% to 110%, still more desirably 95% to 105%, and further desirably 99% to 101%, of "the proportion of the inorganic fibers present in a ceramic block side of the coat layer".

In the present description, "the surface side of the coat layer" refers to a portion which is closer to the surface of the coat layer than to the ceramic block. "The ceramic block side of the coat layer" refers to a portion which is closer to the ceramic block than to the surface of the coat layer.

The honeycomb structure according to the embodiments of the present invention is a honeycomb structure, including:

a ceramic block formed by a plurality of pillar-shaped honeycomb fired bodies combined with one another with an adhesive layer interposed therebetween, each of the honeycomb fired bodies having a large number of cells placed in parallel with one another in a longitudinal direction with a cell wall therebetween; and a coat layer formed on a periphery of the ceramic block, wherein the adhesive layer and the coat layer contain inorganic particles and/or inorganic fibers, the adhesive layer and the coat layer are integrally formed, no interface that divides the adhesive layer from the coat layer exists, and a proportion of the inorganic particles present or a proportion of the inorganic fibers present in a surface side of the coat layer is substantially equal to that in a ceramic block side of the coat layer.

In the thus-configured honeycomb structure, the inorganic particles and/or the inorganic fibers contained in the coat layer are dispersed almost evenly between in the surface side and in the ceramic block side. Therefore, the entire coat layer strength tends to be uniform. In addition, the coat layer surface tends to have no irregularities that are formed by unevenly dispersed inorganic particles and/or inorganic fibers, so that a honeycomb structure that has high surface strength and no floury texture can be manufactured.

Conventional honeycomb structured bodies where an adhesive layer and a coat layer are integrally formed with no interface that divides the two layers tend to be slightly inferior in strength of the coat layer itself and the coat layer surface to conventional honeycomb structured bodies where an adhesive layer and a coat layer are separately formed. Therefore, there has been desired a honeycomb structure excellent in strength of the coat layer itself and the coat layer surface.

The embodiments of the present invention makes it possible to provide a method for manufacturing a honeycomb structure, capable of easily manufacturing a honeycomb structure including a coat layer whose entire strength is uniform and whose surface strength is high, and provide a honeycomb structure including a coat layer whose entire strength is uniform and whose surface strength is high.

The present inventors made various studied on honeycomb structured bodies where an adhesive layer and a coat layer are integrally formed with no interface that divides the two layers, and found that the above-mentioned tendency of the coat layer is attributed to drying of a sealing material paste that is to form a coat layer.

Upon manufacturing a honeycomb structure where an adhesive layer and a coat layer are integrally formed with no interface that divides the two layers, the adhesive layer and the coat layer are formed by filling a sealing material paste into gaps between a plurality of honeycomb fired bodies combined inside a molding frame and into a gap between the molding frame and the honeycomb fired bodies, and then heating and drying this sealing material paste.

Moisture in the sealing material paste that is filled between the honeycomb fired bodies to form an adhesive layer becomes steam by heating, and the steam moves to the honeycomb fired bodies that are porous bodies disposed on both sides of the sealing material paste. Along with this, inorganic particles and fibers contained in the sealing material paste also tend to move to the side of the honeycomb fired bodies that are disposed on both sides of the sealing material paste.

Moisture in the sealing material paste that is filled between the honeycomb fired bodies and the molding frame to form a coat layer becomes steam by heating. The steam can move to the side of the honeycomb fired bodies, but can not move to the side of the molding frame. This is because a conventional manufacturing method of a honeycomb structure in which an adhesive layer and a coat layer are integrally formed with no interface that divides the two layer employs, for example, a dense metal molding frame that is made of a dense metal, or a dense metal molding frame on the inner face side of which a fluorine resin layer is formed to enhance the frame-releasability of the honeycomb structure.

The above-mentioned conventional molding frames have no air permeability and can not permeate air containing steam generated by heating, so that moisture in the sealing material paste that is to form a coat layer inevitably moves from the molding frame side to the honeycomb fired body side. Along with this moisture movement, inorganic fibers, inorganic particles, or the like, contained in the sealing material paste move from the molding frame side to the honeycomb fired body side. This tends to cause uneven dispersion of inorganic particles and inorganic fibers in the sealing material paste, with the result that so-called migration tends to occur, specifically, the inorganic particles and the inorganic fibers are each unevenly present.

When the migration occurs, the entire strength of the obtained coat layer tends to become non-uniform because the inorganic particles and the inorganic fibers are dispersed unevenly between in the surface side and in the ceramic block side. Further, fine irregularities tend to be formed on the coat layer surface due to the uneven dispersion of the inorganic particles and the inorganic fibers, and the coat layer becomes more likely to be broken or separated, and the coat layer surface becomes floury. When a honeycomb structure including the coat layer like this is used as an exhaust gas-purifying filter or a catalyst supporting carrier and this honeycomb structure is exposed to high temperatures, e.g., in regeneration, expansion and contraction of the honeycomb structure may tend to cause generation of cracks in the coat layer.

The case where the sealing material paste contains both inorganic fibers and inorganic particles is mentioned above, and also in the case where the paste contains either inorganic fibers or inorganic particles, the reason for occurrence of migration is the same.

For the purpose of suppressing occurrence of migration, the sealing material paste can be dried and solidified after the honeycomb structure is released from the molding frame. However, when the molding frame is removed before the sealing material paste is not yet cured, the sealing material paste undesirably tends to sag or become deformed, and a resulting coat layer tends to have a surface with irregularities.

In the present invention, the air permeability means a property that allows permeation of air containing moisture (steam) contained in the sealing material paste that is to form the coat layer.

The air permeability is determined in accordance with procedures described in the method A of JIS L 1096.

The contents of JIS L 1096 are incorporated herein by reference in its entirety.

The vent portion in the embodiments of the present invention is not especially limited by its air permeability provided that it can permeate moisture-(steam) containing air. The air permeability is desirably about 0.05 $cc/cm^2/sec$ or more. The upper limit of the air permeability is not especially specified, but the air permeability is more desirably from about 0.05 $cc/cm^2/sec$ to about 100 $cc/cm^2/sec$, and still more desirably in the range from about 1 $cc/cm^2/sec$ to about 100 $cc/cm^2/sec$, and further desirably in the range from about 5 $cc/cm^2/sec$ to about 100 $cc/cm^2/sec$. However, an air permeability exceeding about 100 $cc/cm^2/sec$ does not deteriorate the effects.

The vent portion with air permeability means a portion that allows permeation of air that contains moisture (steam) contained in the sealing material paste that is to form the above-mentioned coat layer.

"The molding frame, an inner face of the molding frame, or a member disposed on an inner face side of the molding frame includes a vent portion with air permeability" means any of the followings: a molding frame itself has air permeability; a molding frame itself has air permeability, and another member with air permeability is further disposed on the inner face side of the molding frame; a molding frame itself has no air permeability, but another member with air permeability is disposed on the inner face side of the molding frame; and a molding frame itself has no air permeability, but recessed portions and/or projective portions are formed on the inner face of the molding frame, and therefore, air-permeable spaces are formed upon injection of a sealing material paste.

The inner face of the molding frame is a surface on the honeycomb fired body side of the molding frame. The member being disposed on the inner face side of the molding frame means that a member with air permeability is integrally or detachably disposed on the inner face side of the molding frame.

Those mentioned below may be exemplified as the vent portion.

In accordance with a first aspect of the present invention, the molding frame itself has no air permeability, and another member with air permeability is further disposed on the inner face side of the molding frame.

As one example of this aspect, a molding frame is made of a dense metal and another member with air permeability is disposed on the inner face side of the molding frame. The member that is disposed on the inner face side of the molding frame may be formed integrally with or detachably from the molding frame.

In the first aspect of the present invention, as an example of forming the molding frame and the member disposed on the inner face side of the molding frame in a detachable manner, the molding frame is made of a dense metal, and a paper member or nonwoven fabric member is disposed on the inner face side of the molding frame.

In accordance with the first aspect of the present invention, as an example of integrally forming the molding frame and the member disposed on the inner face side of the molding frame, the molding frame is made of a dense metal, and a porous resin layer, a porous carbon layer, or the like is disposed on the inner face of the molding frame.

In accordance with a second aspect of the present invention, the molding frame itself (the entire molding frame) has air permeability, and another member is additionally disposed on the inner face side of this molding frame. Specifically, the molding frame is made of a porous metal and has air permeability, and on the inner face side of this molding frame, a member with air permeability is further disposed. The member, which is disposed on the inner face side of the molding frame, may be disposed integrally with or detachably from the molding frame.

According to the second aspect of the present invention, as an example of forming molding frame and the member that is disposed on the inner face side of the molding frame in a detachable manner, the molding frame is made of a porous metal, and any one of a paper member, a nonwoven fabric member, and a mesh member (for example, stainless steel mesh) is disposed on the inner face side of the molding frame.

In accordance with the second aspect of the present invention, as an example of integrally forming the molding frame and the member provided on the inner face side of the molding frame, the molding frame is made of a porous metal, and a porous resin layer, a porous carbon layer, or the like is disposed on the inner face of the molding frame.

In accordance with a third aspect of the present invention, the molding frame itself (the entire molding frame) has air permeability, and the molding frame itself includes a vent portion. As one example of this aspect, the molding frame is made of a porous metal.

The second and third aspects of the present invention can be desirably employed because the molding frame itself has air permeability in the both aspects. The second aspect of the present invention is desirable in view of releasability of the coat layer (frame-releasability of the honeycomb structure). In the second aspect of the present invention, the aspect in which the molding frame and the member disposed on the inner face side of the molding frame are formed in a detachable manner is desirable also in view of workability since the member can be easily replaced, for example, when air permeability of the member disposed on the inner face side of the molding frame is deteriorated by, for example, adhesion of the sealing material paste for forming a coat layer.

In the first and second aspects of the present invention, the member, which is disposed on the inner face side of the molding frame, desirably has a thickness that is from about 1/10 to about 3/4 of the thickness of the molding frame, and more desirably has a thickness that is in the range from about 1/5 to about 1/2 of the thickness of the molding frame. The thickness of the member is appropriately determined in accordance with the material for the molding frame, the porosity of the member, or the like, in view of desired air permeability, strength of the molding frame, or the like.

In the embodiments of the present invention, the molding frame made of a porous metal (hereinafter, also referred to as a porous metal molding frame) means a molding frame that has air permeability and is made of copper, nickel, and stainless steel, or an alloy containing at least one of copper, nickel, and stainless steel.

In the embodiments of the present invention, the molding frame made of a dense metal (hereinafter, also referred to as a dense metal molding frame) means a molding frame that has no air permeability and is made of copper, nickel, stainless, or an alloy containing at least one of copper, nickel, and stainless steel. Among these, the molding frame made of a porous metal or dense metal is desirably made of a stainless steel molding frame.

On the inner face of the porous metal molding frame or the dense metal molding frame, a fluorine resin layer, and the like may be formed in view of releasability of the coat layer (frame-releasability of the honeycomb structure).

A honeycomb structure manufactured by integrally forming an adhesive layer and a coat layer using a vent portion, as mentioned above, tends not to have an interface that divides the adhesive layer into the coat layer. Therefore, when such a honeycomb structure is used as an exhaust gas-purifying filter for vehicles, separation and the like between the adhesive layer and the coat layer hardly occurs, and further strength in the entire coat layer tends to be uniform and suppress cracks of the coat layer. Thus, excellent durability can be given to the honeycomb structure.

The following will specifically mention a method for manufacturing the honeycomb structure according to the embodiments of the present invention, in which the adhesive layer and the coat layer are integrally formed with no interface that divides the two layers using a vent portion. Also specifically mentioned is a honeycomb structure according to the embodiments of the present invention in which occurrence of migration is suppressed, and inorganic fibers and/or inorganic particles are evenly dispersed in the coat layer.

First Embodiment

Hereinafter, a first embodiment, one embodiment of the present invention, will be described.

The present embodiment explains a method for manufacturing a honeycomb structure, in which an adhesive layer and a coat layer are integrally formed with no interface that divides the two layers using a member, including a vent portion, disposed on the inner face side of a dense metal molding frame.

FIG. 1 is a perspective view schematically illustrating one example of a honeycomb structure of the first embodiment of the present invention.

In FIG. 1, a honeycomb structure 100 includes a substantially round pillar-shaped ceramic block 101 and a coat layer 102 provided on the periphery of the ceramic block 101. The ceramic block 101 is formed by a plurality of pillar-shaped honeycomb fired bodies 110 combined with one another with an adhesive layer 103 therebetween.

The pillar-shaped honeycomb fired bodies 110 are made from porous ceramics. Here, a honeycomb fired body 111, a honeycomb fired body 112, and a honeycomb fired body 113, whose cross-sections perpendicular to the longitudinal direction have shapes different from one another, are used. Hereinafter, the honeycomb fired body 111, the honeycomb fired body 112, and the honeycomb fired body 113 are mentioned in detail with reference to FIG. 2A, FIG. 2B, and FIG. 2C.

Figure 2A:
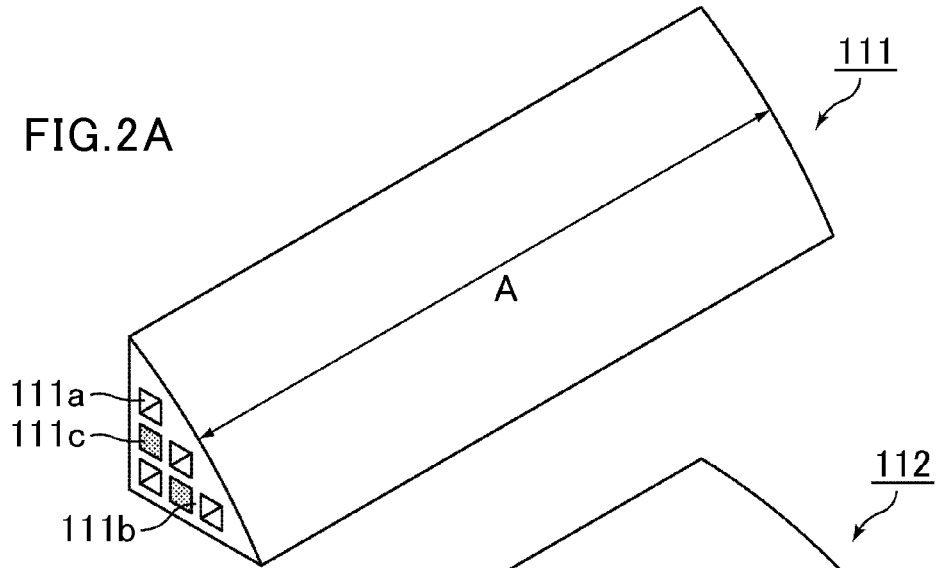
FIG. 2A, FIG. 2B, and FIG. 2C are perspective views each schematically illustrating one example of a honeycomb fired body that configures the honeycomb structure of the first embodiment of the present invention.
Figure 2B:
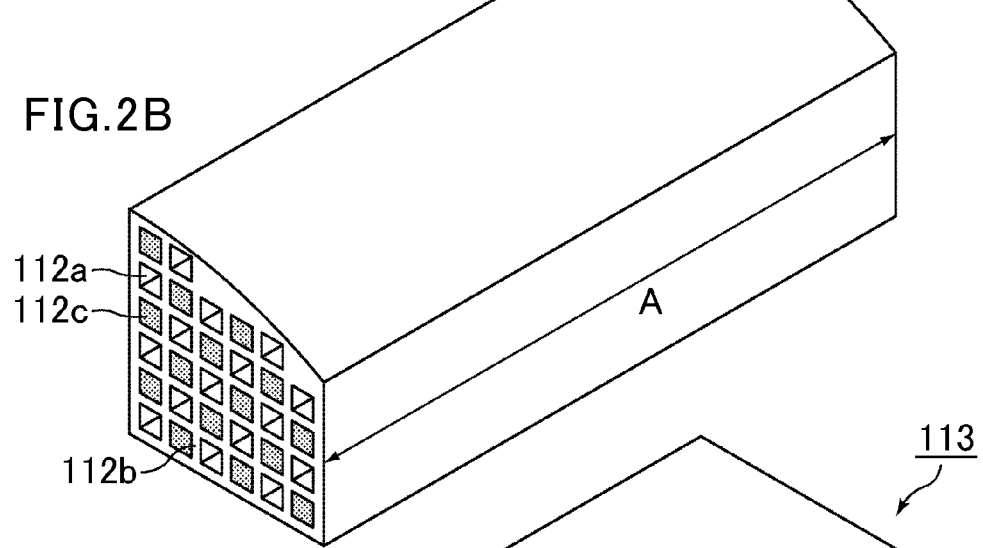
Figure 2C:
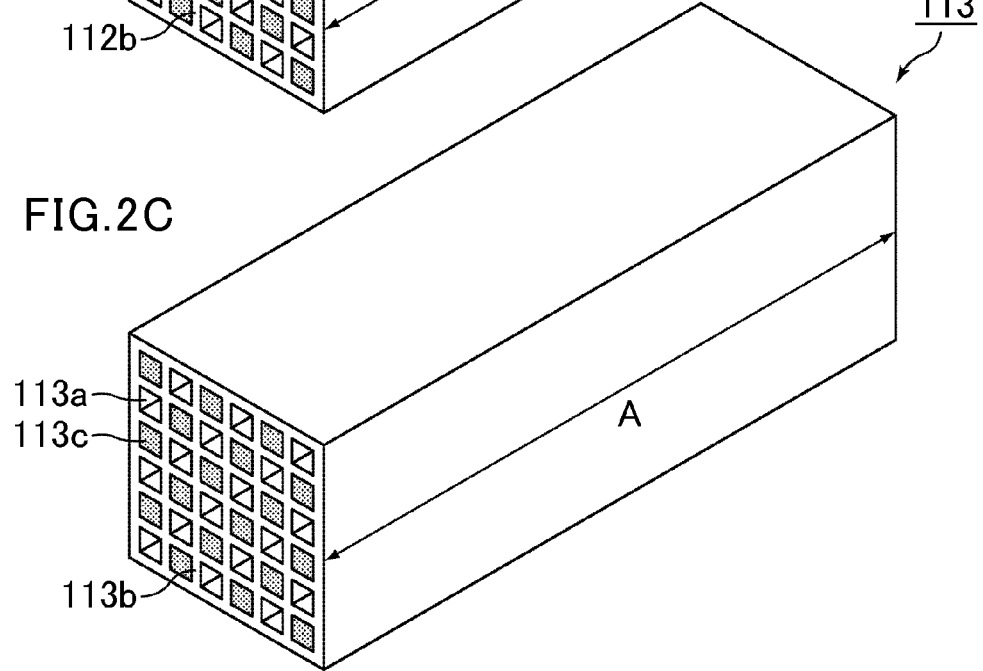

FIG. 2A, FIG. 2B, and FIG. 2C are perspective views each schematically illustrating one example of a honeycomb fired body that configures the honeycomb structure of the first embodiment of the present invention shown in FIG. 1. In FIG. 2A, FIG. 2B, and FIG. 2C, a direction in parallel with the cells, shown by the double-headed arrow A, is referred to as a longitudinal direction; a face where the cells are exposed is referred to as an end face; and a face other than the end face is referred to as a side face.

The side face of the honeycomb fired body 111 shown in FIG. 2A is formed by two plane faces and one curved face. In the honeycomb fired body 111, a large number of cells 111a are placed in parallel with one another in the longitudinal direction (the direction shown by the double-headed arrow A) with a cell wall 111b therebetween, and the cells 111a are plugged on either one end thereof with a plugging material 111c.

The side face of the honeycomb fired body 112 shown in FIG. 2B is formed by three plane faces and one curved face. In the honeycomb fired body 112 as well as in the honeycomb fired body 111, a large number of cells 112a are placed in parallel with one another in the longitudinal direction (the direction shown by the double-headed arrow A) with a cell wall 112b therebetween, and the cells 112a are plugged on either one end thereof with a plugging material 112c.

Further, the side face of the honeycomb fired body 113 shown in FIG. 2C is formed by four plane faces. In the honeycomb fired body 113 as well as in the honeycomb fired body 111, a large number of cells 113a are placed in parallel with one another in the longitudinal direction (the direction shown by the double-headed arrow A) with a cell wall 113b therebetween, and the cells 113a are plugged on either one end thereof with a plugging material 113c.

The honeycomb structure 100, which is formed as mentioned above by the honeycomb fired body 111 including the cells 111a whose one end is plugged with the plugging material 111c, the honeycomb fired body 112 including the cells 112a whose one end is plugged with the plugging material 112c, and the honeycomb fired body 113 including the cells 113a whose one end face is plugged with the plugging material 113c, can be used as an exhaust gas-purifying honeycomb filter. For example, an exhaust gas that flows into one cell 111a never fails to pass through the cell wall 111b, and then is discharged from another cell 111a. When the exhaust gas passes through the cell wall 111b, particulates contained in the exhaust gas are captured by the cell wall 111b. Thus, the exhaust gas can be purified. The same is true for the cell 112a and the cell 113a.

A plurality of the honeycomb fired body 111, the honeycomb fired body 112, and the honeycomb fired body 113, mentioned above, are combined with one another with an adhesive layer 103 therebetween to form a substantially round pillar-shaped ceramic block 101.

In the honeycomb structure 100 in accordance with the first embodiment of the present invention illustrated in FIG. 1, the adhesive layer 103 and the coat layer 102 are integrally formed using the same sealing material paste, and no interface that divides the two layers exists. When the honeycomb structure 100 with such a configuration is used as an exhaust gas-purifying filter, separation, cracks, and the like tend not to occur between the adhesive layer 103 and the coat layer 102 even in use under high temperature atmosphere.

The adhesive layer 103 and the coat layer 102 contain inorganic fibers and inorganic particles. The adhesive layer 103 and the coat layer 102 may contain at least one of inorganic fibers and inorganic particles, but desirably contain both inorganic fibers and inorganic particles in view of strength.

In the honeycomb structure 100 in accordance with the first embodiment of the present invention, a proportion of the inorganic particles present in a surface side of the coat layer 102 is substantially equal to a proportion of the inorganic particles present in a ceramic block 101 side of the coat layer 102, and a proportion of the inorganic fibers present in a surface side of the coat layer 102 is substantially equal to a proportion of the inorganic fibers present in a ceramic block 101 side of the coat layer 102. In the honeycomb structure 100 with such a configuration, the coat layer 102 itself tends to have uniform strength, a high surface strength, and a non-floury surface.

Examples of the inorganic particles that are contained in the adhesive layer 103 and the coat layer 102 include inorganic powders made of carbides such as silicon carbide, nitrides such as silicon nitride and boron nitride, and the like. Among these, silicon carbide powders, having superior thermal conductivity, are desirable. These may be singly used or two or more kinds thereof may be used in combination.

The average particle diameter of the inorganic particles is desirably from about 0.1 μm to about 50 μm, and more desirably in the range from about 0.1 μm to about 1.0 μm.

Examples of the inorganic fibers that are contained in the adhesive layer 103 and the coat layer 102 include ceramic fibers of silica-alumina, mullite, alumina, silica, and the like. Among these, inorganic fibers of alumina are desirable. These may be singly used or two or more kinds thereof may be used in combination.

The average diameter of the inorganic fibers is desirably from about 1 μm to about 50 μm, and more desirably in the range from about 5 μm to about 40 μm. The average fiber length of the inorganic fibers is desirably in from about 10 μm to about 200 μm, and more desirably in the range from about 20 μm to about 100 μm.

Hereinafter, a method for manufacturing the honeycomb structure 100 with the above configuration in accordance with the first embodiment of the present invention will be described.

FIG. 3 is a flow chart of a method for manufacturing the honeycomb structure of the first embodiment of the present invention.

As illustrated in FIG. 3, the manufacturing of the honeycomb structure 100 in accordance with the first embodiment of the present invention includes: molding honeycomb molded bodies (step S1); firing the honeycomb molded bodies to form honeycomb fired bodies (step S2); disposing and fixing the honeycomb fired bodies in the molding frame (step S3); and filling a sealing material paste into the molding frame (step S4); and drying and solidifying the filled sealing material paste (step S5). Through these steps, the substantially round pillar-shaped honeycomb structure 100 illustrated in FIG. 1 can be manufactured without any post-processes such as cutting.

The following description will discuss the respective steps.

First, in the molding (S1), honeycomb molded bodies are manufactured. The shape of the honeycomb molded bodies is not especially limited, provided that it is a pillar shape. In the present embodiment, three kinds of honeycomb fired bodies, i.e. the honeycomb fired body 111, the honeycomb fired body 112, and the honeycomb fired body 113, illustrated in FIG. 2A, FIG. 2B, and FIG. 2C, are manufactured to manufacture the substantially round pillar-shaped honeycomb structure 100 illustrated in FIG. 1, and therefore, three kinds of honeycomb molded bodies having almost the same shapes as the respective honeycomb fired bodies are manufactured with taking thermal contraction and the like into consideration. The honeycomb molded bodies are manufactured by extrusion-molding a raw material composition containing ceramic powders and a binder.

The raw material composition may be, for example, such a wet mixture as being prepared by mixing silicon carbide powders with different particle diameters as the ceramic powders, an organic binder as the binder, a liquid plasticizer, a lubricant, and water.

The ceramic powders are not especially limited. For example, the ceramic powders may be a mixture of about 100 parts by weight of silicon carbide powders with an average particle diameter of about 1.0 μm to about 50 μm and about 5 to about 65 parts by weight of silicon carbide powders with an average particle diameter of about 0.1 μm to about 1.0 μm.

The above-prepared wet mixture as a raw material composition is extrusion-molded with an extrusion-molding machine to form honeycomb molded bodies of various shapes. The extrusion-molded honeycomb molded bodies are dried with a drying apparatus. For the drying, a microwave drying apparatus, a hot-air drying apparatus, a dielectric drying apparatus, a reduced-pressure drying apparatus, a vacuum drying apparatus, a freeze drying apparatus, and the like, can be used.

The dried honeycomb molded bodies are cut into a desired length with a cutting apparatus.

Then, a plugging material paste in a specific amount is filled into either one end of the cells to plug the cells. The cells can be plugged by, for example, a method of attaching a mask for plugging to the end face (cut face) of the honeycomb molded body so that only the cells required to be plugged are filled in with the plugging material paste.

The plugged honeycomb molded bodies are heated to be degreased in a degreasing furnace. The degreasing conditions are not especially limited and appropriately determined by the kind, amount, and the like of organic matters of the honeycomb molded bodies. For example, the degreasing may be carried out at about 400° C. for about two hours.

Next, in the firing (S2), the honeycomb molded bodies manufactured in the molding (S1) are fired in a firing furnace to manufacture three kinds of honeycomb fired bodies, i.e., the honeycomb fired body 111, the honeycomb fired body 112, and the honeycomb fired body 113.

The firing conditions are not especially limited. The firing temperature is desirably in the range from about 2000° C. to about 2200° C.

Thus, manufactured are various pillar-shaped honeycomb fired bodies, i.e., a pillar-shaped honeycomb fired body 111 formed by a large number of cells 111a placed in parallel with one another in the longitudinal direction with a cell wall 111b therebetween, a pillar-shaped honeycomb fired body 112 formed by a large number of cells 112a placed in parallel with one another in the longitudinal direction with a cell wall 112b therebetween, and a pillar-shaped honeycomb fired body 113 formed by a large number of cells 113a placed in parallel with one another in the longitudinal direction with a cell wall 113b therebetween, as illustrated in FIG. 2A, FIG. 2B, and FIG. 2C.

Here, the pore diameter and the like of the honeycomb fired body 111, the honeycomb fired body 112, and the honeycomb fired body 113 can be set to a desired value by adjusting the particle diameter of the ceramic powders contained in the raw material composition.

Next, in the fixing (S3), the obtained three kinds of honeycomb fired bodies composed of the honeycomb fired body 111, the honeycomb fired body 112, and the honeycomb fired body 113, are combined into a substantially round-pillar shape and disposed and fixed inside a molding frame (tubular jig). Specifically, the bottom surface and top surface of the tubular jig are covered, and thereby leakage of the sealing material paste from the molding frame is prevented even when the tubular jig is filled with the sealing material paste. Alternatively, the top surface or bottom surface of the jig, which is provided with the tubular jig and the bottom surface or the top surface of the plate material, may be covered.

Figure 4:
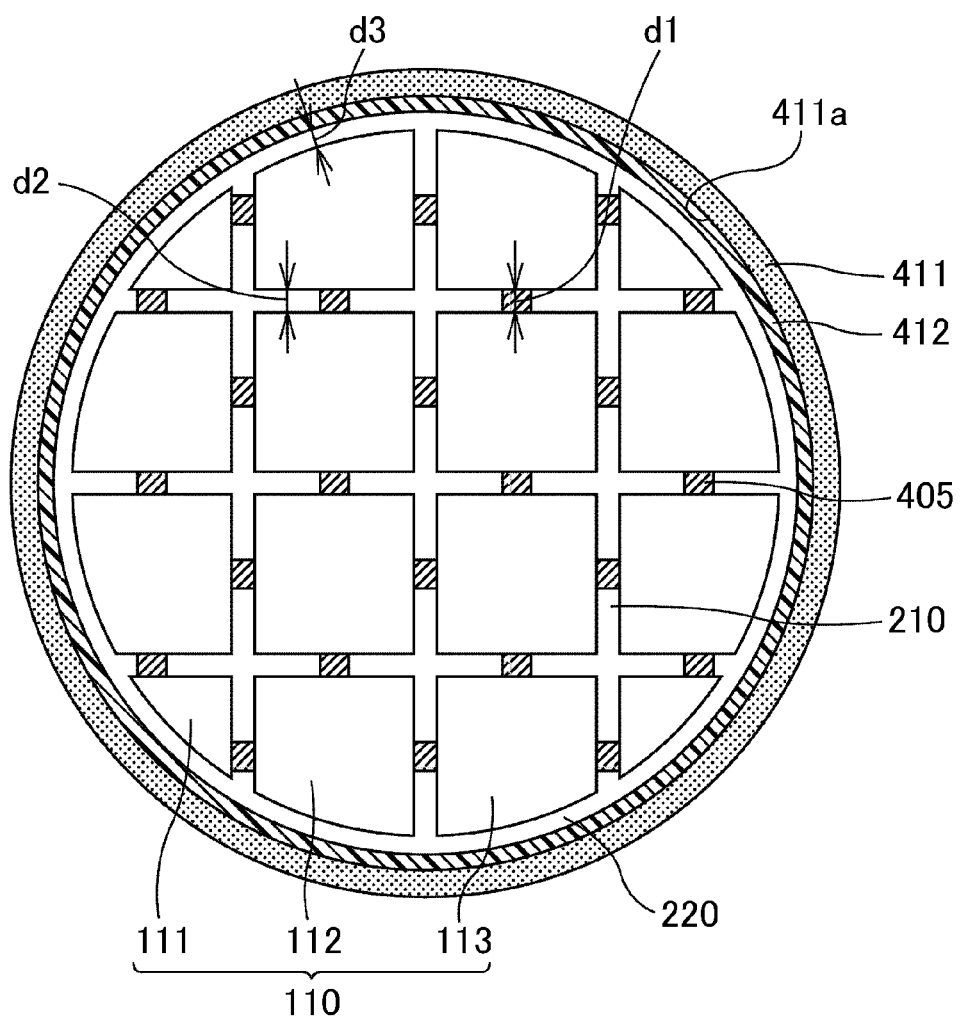
FIG. 4 is a cross-sectional view along the direction perpendicular to the longitudinal direction of the honeycomb fired bodies, schematically illustrating the state where the honeycomb fired bodies are disposed inside a molding frame in the first embodiment of the present invention.

FIG. 4 is a cross-sectional view along the direction perpendicular to the longitudinal direction of the honeycomb fired bodies, schematically illustrating the state where the honeycomb fired bodies are disposed inside a molding frame in the first embodiment of the present invention.

In FIG. 4, a molding frame 411 is a dense metal molding frame with no air permeability.

The molding frame 411 is made of copper, nickel, stainless steel, or an alloy containing at least one of copper, nickel, and stainless steel. Accordingly, the molding frame 411 has strength high enough to fix the honeycomb fired bodies.

The molding frame 411 has a substantially tubular shape and has an inner space that accommodates the honeycomb fired bodies 110 (111, 112, 113).

The inner face of the molding frame 411 is desirably provided with coating treatment of fluorine resins or the like, for example, for improving frame-releasability and the like.

A member including a vent portion is disposed on the side of an inner face 411a of the molding frame 411.

The member including a vent portion is disposed for the purpose of suppressing migration of inorganic fibers, inorganic particles, and the like in the coat layer surface as mentioned above. Accordingly, the member including the vent portion is desirably disposed on the entire surface that is in contact with the sealing material paste that is to form the coat layer. Such a member that is disposed on the inner face side of the molding frame tends to allows suppressing migration of the inorganic fibers and the inorganic particles contained in the sealing material paste in the below-mentioned drying (S5).

In the present embodiment, the member is configured by a paper 412 (also referred to as a paper member). The paper 412 is not especially limited, provided that it has air permeability. The air permeability determined in accordance with the method A of JIS L 1096 is desirably about 0.05 $cc/cm^2/sec$ or more, more desirably in the range from about 0.05 $cc/cm^2/sec$ to about 100 $cc/cm^2/sec$, still more desirably in the range from about 1 $cc/cm^2/sec$ to about 100 $cc/cm^2/sec$, and further desirably in the range from about 5 $cc/cm^2/sec$ to about 100 $cc/cm^2/sec$.

Further, the paper 412 desirably has a thickness of about 0.06 mm to about 0.12 mm, and more desirably about 0.08 mm to about 0.10 mm in view of better workability and suitable usability, because the paper 412 is disposed on the inner face side of the molding frame 411.

In addition, the paper 412 more desirably has an average pore diameter of about 0.1 μm to about 50 μm, and more desirably about 0.1 μm to about 5 μm.

Taking into consideration the frame-releasability of the honeycomb structure after the below-mentioned drying (S5), it is desirable that the paper member surface is provided with coating treatment and the like.

Examples of such a paper which has been provided with coating treatment and the like include a silicon-treated craft paper, glassine paper, and the like. The silicon-treated craft paper or glassine paper is a craft paper or glassine paper, the surface of which has been coated with a silicone resin material, or a craft paper or glassine paper with which a silicone resin material has been impregnated. In the present description, a craft paper or glassine paper, on the surface of which a release layer containing silicon is formed, can be desirably used. The paper which has been provided with a coating treatment and the like has better releasability, and therefore, the honeycomb structure can show improved frame-releasability when being released from the molding frame.

The silicone-treated paper member has a body part and a silicone coat part.

The body part is a part including a paper base, and the silicone coat part is a part including the coated silicone resin material.

Examples of the coating treatment method include, but not particularly limited to, known methods using, for example, an air knife, a roll coater, a bar coater, a comma coater, and a blade coater.

The body part has a vent portion, and so does the silicon coat part. The vent portion refers to a portion (pore) through which air containing moisture (water vapor) in the sealing material paste forming the coat layer can permeate.

The vent portion of the body part is a hole (pore) present in the body part, and the vent portion of the silicon coat part is a hole (pore) present in the silicon coat part.

The vent portion of the body part has an average pore diameter of desirably about 0.1 μm to about 50 μm, more desirably about 1 μm to about 50 μm, and further desirably about 1 μm to about 30 μm. If the vent portion of the body part has an average pore diameter of about 0.1 μm or more, air permeability tends to be secured. If the vent portion of the body part has an average pore diameter of about 50 μm or less, manufacturing is not difficult.

The vent portion of the silicon coat part (silicon-treated part) has an average pore diameter of desirably about 20 μm to about 50 μm, and more desirably about 30 to about 40 μm.

The pore diameter refers to a maximum length of a straight line drawn in a pore (vent portion). Pores can be observed by an SEM photograph of a cross section of paper in a thickness direction. The average pore diameter can be obtained by measuring the aforementioned maximum length relative to a pore having a suitable size among the pores in the SEM photograph.

The paper 412 is detachably attached to the molding frame 411. For attaching the paper 412 to the inner face 411a side of the molding frame 411, for example, the paper 412 may be attached to the inner face 411a side of the molding frame 411 with a double-faced tape.

According to the above configuration in which the paper 412 is detachably attached to the molding frame 411, the paper may be more easily disposed on the inner face side of the molding frame 411, and also may be more easily replaced or discarded after release of the honeycomb structure 100. Accordingly, for example, when the paper 412 is contaminated by adhesion of the sealing material paste, a next honeycomb structure 100 can be readily manufactured just by replacing the paper 412 without washing the molding frame 411.

Here, after the below-mentioned drying (S5) and release of the honeycomb structure, the paper may be discarded or reused.

In FIG. 4, a plurality of the honeycomb fired bodies 110 (111, 112, 113) are combined with one another with a spacer 405 therebetween into a substantially cylindrical (tube) shape inside the molding frame 411 on the inner face 411a side of which the paper 412 is disposed.

The spacer 405 has a thickness d1 that is almost the same as the thickness of the adhesive layer 103 that is formed later, and also almost the same as a distance d2 of a gap 210 between side faces of the combined honeycomb fired bodies 110.

A distance d3 of a gap 220 between the paper 412 and the honeycomb fired bodies 110 combined into a substantially cylindrical shape is almost the same as the thickness of the coat layer 102 that is formed later.

Examples of the material for the spacer 405 include, but not particularly limited to, cardboards, fibrous papers, nonwoven fabrics, and inorganic material sheets, and the like. The cardboards, fibrous papers, nonwoven fabrics, and inorganic material sheets, and the like are also referred to, respectively, as cardboard members, fibrous paper members, nonwoven fabric members, and inorganic material sheet members, and the like members.

Next, in the filling (S4), a sealing material paste is filled into the gaps 210 between the side faces of the honeycomb fired bodies 110 and into the gap 220 between the paper 412 and the side faces of the honeycomb fired bodies 110. Although the way of filling the sealing material paste is not especially limited, the present embodiment is mentioned with reference to an example case where the sealing material paste is filled with a paste-supplying apparatus installed on the molding frame 411.

Figure 5A:
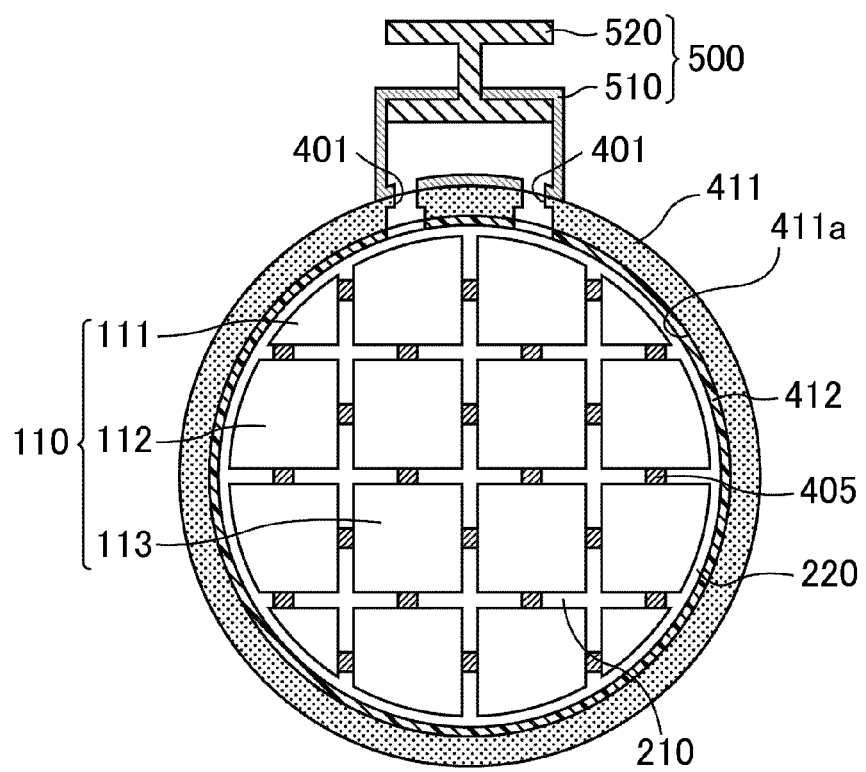
FIG. 5A is a cross-sectional view along the direction perpendicular to the longitudinal direction of the honeycomb fired bodies, schematically illustrating the state where a supply apparatus is installed on the molding frame in the first embodiment of the present invention.

FIG. 5A is a cross-sectional view along the direction perpendicular to the longitudinal direction of the honeycomb fired bodies, schematically illustrating the state where a supply apparatus is installed on the molding frame in the first embodiment of the present invention.

Figure 5B:
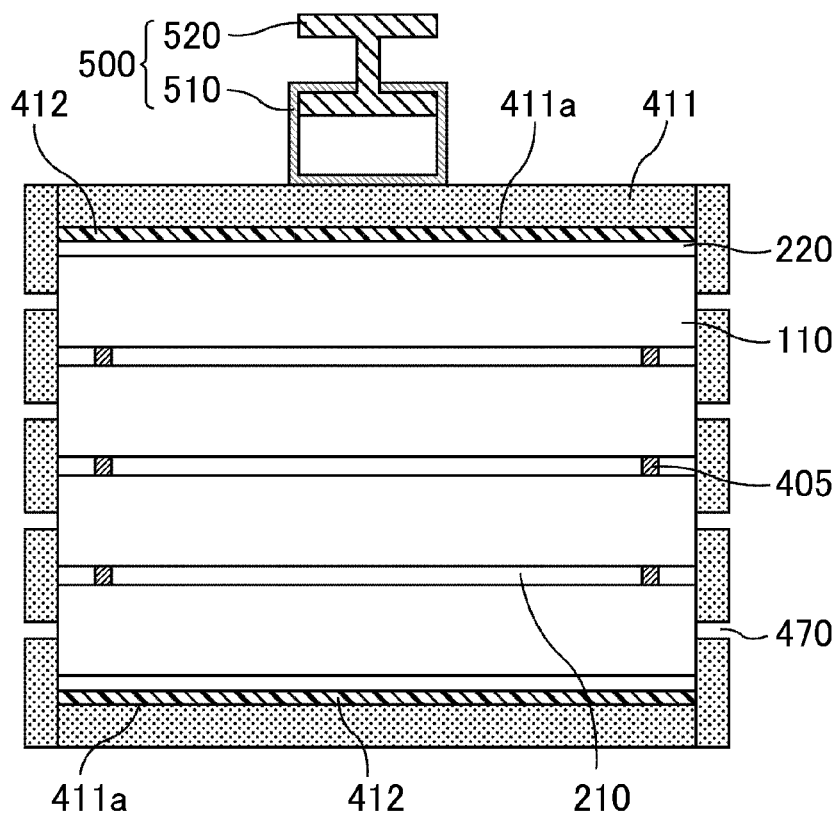
FIG. 5B is a cross-sectional view along the direction parallel to the longitudinal direction of the honeycomb fired bodies, schematically illustrating the state where the supply apparatus is installed on the molding frame in the first embodiment of the present invention.

FIG. 5B is a cross-sectional view along the direction parallel to the longitudinal direction of the honeycomb fired bodies, schematically illustrating the state where the supply apparatus is installed on the molding frame in the first embodiment of the present invention.

As illustrated in FIG. 5A and FIG. 5B, a supply apparatus 500 for filling the sealing material paste is installed on the molding frame 411. The supply apparatus 500 includes a paste chamber 510 that accommodates the sealing material paste, and an extruding mechanism 520 for extruding the sealing material paste from the paste chamber 510 into the molding frame 411.

The molding frame 411 has an inlet 410 at the junction with the supply apparatus 500, and the sealing material paste is charged through this inlet 410. The molding frame 411 has a plurality of openings 470 formed on both end faces of the honeycomb fired bodies 110.

Figure 6A:
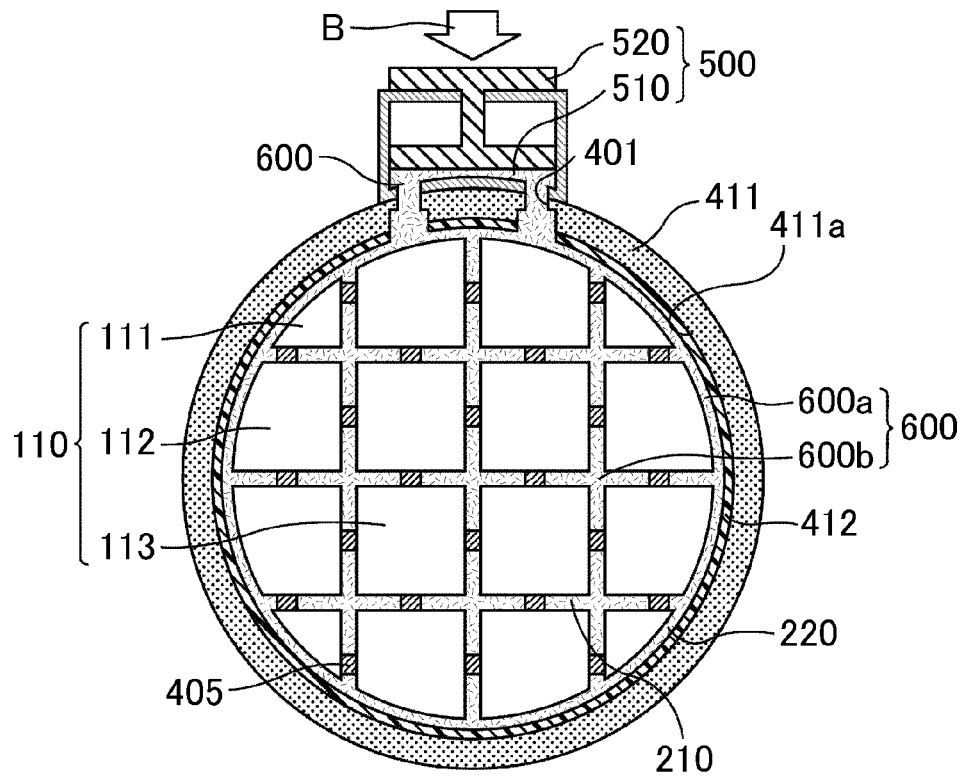
FIG. 6A is a cross-sectional view along the direction perpendicular to the longitudinal direction of the honeycomb fired bodies, schematically illustrating the state where a sealing material paste is filled into the inside of the molding frame in the first embodiment of the present invention.

FIG. 6A is a cross-sectional view along the direction perpendicular to the longitudinal direction of the honeycomb fired bodies, schematically illustrating the state where a sealing material paste is filled into the inside of the molding frame in the first embodiment of the present invention.

Figure 6B:
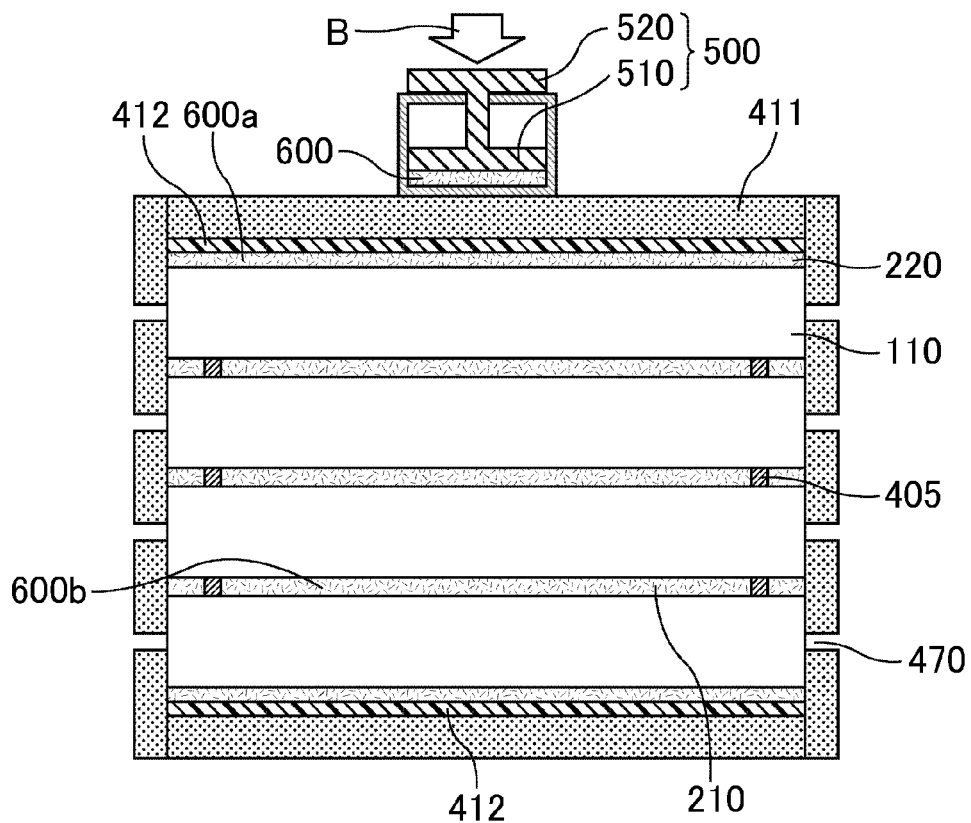
FIG. 6B is a cross-sectional view along the direction parallel to the longitudinal direction of the honeycomb fired bodies, schematically illustrating the state where the sealing material paste is filled into the inside of the molding frame in the first embodiment of the present invention.

FIG. 6B is a cross-sectional view along the direction parallel to the longitudinal direction of the honeycomb fired bodies, schematically illustrating the state where the sealing material paste is filled into the inside of the molding frame in the first embodiment of the present invention.

Into the paste chamber 510 of the supply apparatus 500 illustrated in FIG. 5A and FIG. 5B, a sealing material paste is supplied, and as illustrated in FIG. 6A and FIG. 6B, a sealing material paste 600 is pushed by the extrusion mechanism 520 into the arrow B direction, and then supplied into the inside of the molding frame 411 from the paste chamber 510 through the inlet 401. Thus, the sealing material paste 600 is filled into the gap 220 between the paper 412 disposed on the inner face 411a side of the molding frame 411 and the honeycomb fired bodies 110 and into the gaps 210 between the honeycomb fired bodies 110.

Hereinafter, the sealing material paste 600 that is filled into the gap 220 between the paper 412 and the honeycomb fired bodies 110 to form a coat layer is referred to as a sealing material paste 600a. The sealing material paste 600 that is filled into the gap 210 between the honeycomb fired bodies 110 to form an adhesive layer is referred to as a sealing material paste 600b.

According to the first embodiment of the present invention, the sealing material paste 600 is the above-mentioned one containing inorganic particles and inorganic fibers. The sealing material paste 600 containing inorganic particles and inorganic fibers has a reduced viscosity by containing a high level of moisture. Thus, the sealing material paste 600 has increased flowability, and therefore, tends to be filled well into the gaps 210 between the honeycomb fired bodies 110 and into the gap 220 between the inner face 411a of the molding frame 411 and the honeycomb fired bodies 110.

Examples of the moisture contained in the sealing material paste 600 include moisture derived from the organic binder, and the like. Examples of the organic binder include polyvinyl alcohol, methylcellulose, ethylcellulose, carboxymethylcellulose, and the like. These may be singly used or two or more kinds thereof may be used in combination. Among the organic binders, carboxy methylcellulose is desirable.

In the next drying (S5), the molding frame 411 in which the sealing material paste 600 has been filled is heated. The drying conditions are not particularly limited, but, for example, heating is carried out for about 1 hour at about 100° C. to about 150° C. Thus, the sealing material paste 600a is solidified to form a coat layer 102, and the sealing material paste 600b is solidified to form an adhesive layer 103.

Here, the sealing material paste 600a is heated with being in contact with the paper 412. According to this configuration, migration of the inorganic fibers and the like contained in the sealing material paste 600 is suppressed, and in the coat layer 102 formed by the solidified sealing material paste 600a, a proportion of the inorganic particles present in a surface side is almost equal to a proportion of the inorganic particles present in a ceramic block side, and a proportion of the inorganic fibers present in a surface side is almost equal to a proportion of the inorganic fibers present in a ceramic block side. The reason for this is described with reference to FIG. 7A and FIG. 7B below.

Figure 7A:
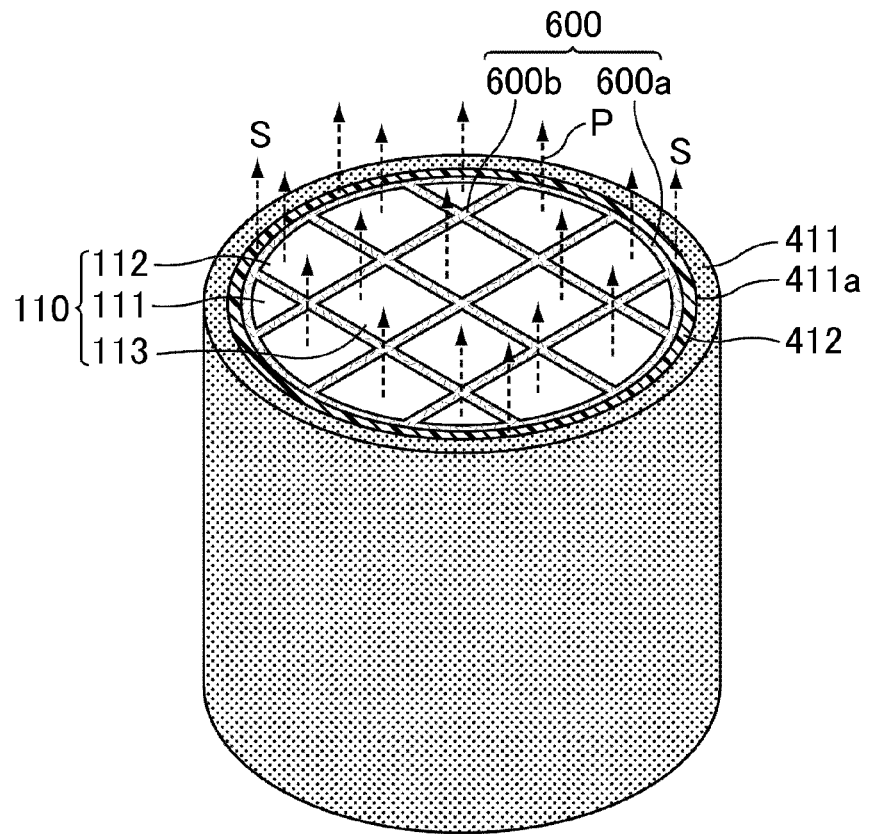
FIG. 7A is a perspective view schematically illustrating the state of the molding frame in drying (S5) in the first embodiment of the present invention.

FIG. 7A is a perspective view schematically illustrating the state of the molding frame in drying (S5) in the first embodiment of the present invention.

Figure 7B:
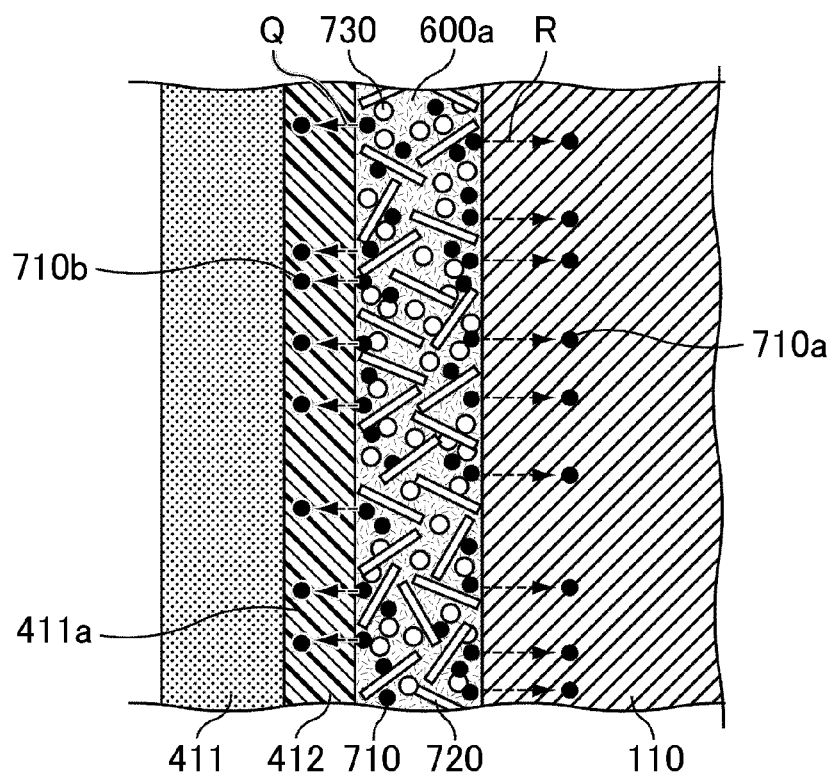
FIG. 7B is a cut-away cross-sectional view along the direction perpendicular to the longitudinal direction of the honeycomb fired bodies, schematically illustrating movement of moisture contained in the sealing material paste that is in contact with the inner face side of the molding frame in the drying (S5) in the first embodiment of the present invention.

FIG. 7B is a cut-away cross-sectional view along the direction perpendicular to the longitudinal direction of the honeycomb fired bodies, schematically illustrating movement of moisture contained in the sealing material paste that is in contact with the inner face side of the molding frame in the drying (S5) in the first embodiment of the present invention. In FIG. 7B, the paper 412 is disposed on the side of an inner face 411a of the molding frame 411.

In FIG. 7A, the arrow P indicates a movement direction of moisture contained in the sealing material paste 600 (600a, 600b), and the arrow S indicates a movement direction of moisture contained in the sealing material paste 600a.

In FIG. 7B, the arrow Q and the arrow R each indicate a movement direction of moisture contained in the sealing material paste 600a. Further, in FIG. 7B, moisture 710 contained in the sealing material paste 600a is schematically indicated by black spheres, and a portion including many black spheres contain a high level of moisture, and a portion including few black spheres contain a low level of moisture.

In the drying (S5), when the sealing material paste 600 is heated, moisture contained in the sealing material paste 600 becomes steam.

The moisture contained in the sealing material paste 600b, which is filled into the gaps 210 between the honeycomb fired bodies 110, becomes steam and moves to the honeycomb fired bodies 110 side. Then, air containing the steam passes through the honeycomb fired bodies 110 that are porous bodies, and then are discharged from the end faces of the honeycomb fired bodies 110 to the outside as indicated by the arrow P in FIG. 7A. Although not illustrated in this figure, the molding frame 411 has, on the end face sides of the honeycomb fired bodies 110, openings 470 through which the steam-containing air is discharged to the outside, as indicated in FIG. 6B.

With respect to the moisture contained in the sealing material paste 600a having been filled into the gap 220 between the honeycomb fired bodies 110 and the paper 412 disposed on the inner face 411a side of the molding frame 411, moisture 710 having become steam moves to the paper 412 side and the honeycomb fired body 110 side as indicated in FIG. 7B. Steam 710a having moved to the honeycomb fired body 110 side passes through the honeycomb fired body 110 as indicated by the arrow R, and then is discharged from the end face of the honeycomb fired body 110 to the outside as indicated by the arrow P in FIG. 7A.

Steam 710b having moved to the paper 412 side is kept in the paper 412, or discharged from the end face of the paper 412 to the outside together with air containing the steam 710b as indicated by the arrow S in FIG. 7A.

Here, the sealing material paste 600a contains inorganic fibers 720 and inorganic particles 730 as well as the moisture 710.

As mentioned above, the moisture 710 contained in the sealing material paste 600a becomes the steam 710a and moves to the honeycomb fired body 110 side as indicated by the arrow R, and along with this, a part of each of the inorganic fibers 720 and the inorganic particles 730 moves to the honeycomb fired body 110 side.

Further, the moisture 710 contained in the sealing material paste 600a becomes the steam 710b and moves to the paper 412 side as indicated by the arrow Q, and along with this, a part of each of the inorganic fibers 720 and the inorganic particles 730 tends to move to the molding frame 411 side.

Thus, in the present embodiment, moisture 710 in the sealing material paste 600a moves to the paper 412 side as well as to the honeycomb fired body 110 side, which can suppress bias of movement to the honeycomb fired body 110 side of the inorganic fibers 720 and the inorganic particles 730, i.e., migration.

In addition, it becomes easier for the inorganic fibers 720 and the inorganic particles 730 contained in the sealing material paste 600a to be evenly dispersed also into the paper 412 side, and therefore, uniform strength tends to be obtained in the entire coat layer after release from the molding frame, and the coat layer surface tends to be flattened.

It is desirable that the inorganic fibers 720 and the inorganic particles 730 contained in the sealing material paste 600a are evenly dispersed, but also by suppressing bias of movement to the honeycomb fired body side of only either the inorganic fibers 720 or the inorganic particles 730, the strength of the coat layer tends to be uniformed, and the surface smoothness of the coat layer tends to be enhanced.

Further, an average pore diameter of the vent portion of the paper member being smaller than the average particle diameter of the inorganic particles contained in the sealing material paste 600a tends to prevent the inorganic particles from appearing on the surface of the coat layer, along with movement of the inorganic particles containing the steam 710b. As a result, a coat layer having a smoother surface tends to be obtained.

When the paper 412 is fixed to the molding frame 411 with a double-faced tape, a stick layer of the double-faced tape for fixing the paper 412 is supposed to exist on the inner face side of the molding frame 411. This stick layer is melt and evaporated by heating at about 100° C. to about 150° C. as mentioned above, and therefore, the air permeability of the paper is not deteriorated. However, taking the air permeability of the paper 412 into consideration, it is desirable that the double-faced tape for fixing the paper 412 to the molding frame 411 is disposed as narrowly as possible.

After completion of the drying, the honeycomb structure 100 is release from the molding frame, and the paper 412 is separated. Thus, the honeycomb structure 100 in which the inorganic fibers 720 and the inorganic particles 730 are evenly dispersed in the surface side of the coat layer 102 can be manufactured. In this honeycomb structure 100, the entire coat layer 102 has uniform strength, and the surface of the coat layer 102 is free of floury texture and the like and has high strength.

In the honeycomb structure 100, the adhesive layer 103 and the coat layer 102 are integrally formed with no interface that divides the two layers therebetween. Therefore, even after heat cycle such as regeneration is repeated for a long period of time, it may be easier to prevent the honeycomb structure from being destroyed (separated, cracked, or the like) between the adhesive layer 103 and the coat layer 102.

Having the above characteristics, the honeycomb structure 100 of the first embodiment of the present invention can be desirably used as an exhaust gas-purifying filter.

In the above description, in the drying (S5), only drying of the sealing material paste is carried out, but the drying may be followed by degreasing, firing, and the like at temperatures higher than in the drying.

Hereinafter, the effects of the honeycomb structure and the method for manufacturing the honeycomb structure of the present embodiment will be cited.

(1) The method for manufacturing the honeycomb structure of the present embodiment includes: extrusion-molding honeycomb molded bodies each having a cell wall in a peripheral portion thereof; firing the honeycomb molded bodies to form honeycomb fired bodies; fixing a plurality of the honeycomb fired bodies in a molding frame; filling a sealing material paste into a gap between the molding frame and the honeycomb fired bodies and into gaps between the honeycomb fired bodies; and drying and solidifying the sealing material paste to form an adhesive layer and a coat layer. The molding frame, an inner face of the molding frame, or a member disposed on an inner face side of the molding frame includes a vent portion with air permeability. In the drying, the above sealing material paste is dried and solidified while being in contact with the vent portion.

In such a manufacturing method of the honeycomb structure, in the drying, moisture contained in the sealing material paste becomes steam and discharged to the outside through pores formed in the honeycomb fired bodies, and also, moves to the side of the member disposed on the inner face side of the molding frame. Thus, the moisture contained in the sealing material paste moves to the side of the member disposed on the inner face side of the molding frame and to the side of the honeycomb fired bodies. Therefore, occurrence of migration of the inorganic fibers and the inorganic particles contained in the sealing material paste tends to be suppressed. As a result of this, a honeycomb structure including a coat layer whose entire strength is uniform and whose surface strength is high may be more easily manufactured.

(2) Further, according to the method for manufacturing the honeycomb structure of the first embodiment of the present invention, the molding frame itself has no air permeability, but the member that is disposed on the inner face side of the molding frame is constituted by a paper member, so that air permeability tends to be provided by this paper member.

(3) Further, according to the fixing in the method for manufacturing the honeycomb structure of the first embodiment of the present invention, a plurality of the honeycomb fired bodies are fixed using a spacing member that keeps the honeycomb fired bodies at regular spaces.

When the fixing is thus carried out, the adhesive paste is filled into gaps between the positioned honeycomb fired bodies in the filing, and as a result, the thickness of the adhesive paste becomes substantially the same as the width of each gap between the honeycomb fired bodies. Therefore, thickness variations of the adhesive material paste tend to be decreased, and a honeycomb structure with high dimensional accuracy may be manufactured more easily.

Further, the honeycomb fired bodies are placed at specific positions before the filling of the adhesive material paste, and therefore, even if positional displacement of one honeycomb fired body occurs, positions of other honeycomb fired bodies tend not to be influenced. Therefore, a honeycomb structure the entire of which has high dimensional accuracy may be manufactured more easily.

(4) Further, the honeycomb structure of the first embodiment of the present invention is a honeycomb structure, including: a ceramic block formed by a plurality of pillar-shaped honeycomb fired bodies combined with one another with an adhesive layer interposed therebetween, each of the honeycomb fired bodies having a large number of cells placed in parallel with one another in a longitudinal direction with a cell wall therebetween; and a coat layer formed on a periphery of the ceramic block, wherein the adhesive layer and the coat layer contain inorganic particles and inorganic fibers, the adhesive layer and the coat layer are integrally formed with no interface that divides the two layers, and a proportion of the inorganic particles present in a surface side of the coat layer is substantially equal to a proportion of the inorganic particles present in a ceramic block side of the coat layer, and a proportion of the inorganic fibers present in a surface side of the coat layer is substantially equal to a proportion of the inorganic fibers present in a ceramic block side of the coat layer.

According to the honeycomb structure having such a configuration, both of the inorganic fibers and the inorganic particles contained in the coat layer are almost evenly dispersed between in the surface side and in the ceramic block side, and therefore the entire coat layer tends to have uniform strength. Further, the coat layer surface tends not to have irregularities caused by uneven dispersion of the inorganic fibers and the inorganic particles, so that a non-floury honeycomb structure that tends to have a high surface strength can be manufactured.

Here, the above-mentioned uniform strength and improved surface flatness of the coat layer tend to be achieved also in the case where the coat layer contains only either the inorganic fibers or the inorganic particles and bias of movement to the honeycomb fired body side of the inorganic fibers or the inorganic particles is suppressed, not being limited to the case where bias of the movement to the honeycomb fired body side is suppressed for both the inorganic fibers and the inorganic particles contained in the coat layer.

Hereinafter, an example that more specifically discloses the first embodiment of the present invention will be mentioned. The present invention is not limited to only this example. In example 1 and comparative example 1, a substantially round pillar-shaped honeycomb structure illustrated in FIG. 1 was manufactured, and the obtained honeycomb structure was evaluated for occurrence of migration, existence of floury texture on the coat layer surface in the following procedures.

The occurrence of migration in the coat layer was determined by preparing a sample obtained by cutting the manufactured honeycomb structure in the direction perpendicular to the longitudinal direction, and then observing the state of the surface side and the honeycomb fired body side of the coat layer with a scanning electron microscopy (SEM).

The existence of floury texture on the coat layer surface was determined by visually observing the surface of the coat layer and also touching the coat layer surface by finger to visually determine whether or not flour adheres to the finger.

Example 1

Manufacture of Honeycomb Molded Bodies

Coarse powder of silicon carbide having an average particle diameter of 22 μm (52.8% by weight) and fine powder of silicon carbide having an average particle diameter of 0.5 μm (22.6% by weight) were mixed. To the resulting mixture were added and kneaded acrylic resin 2.1% by weight, an organic binder (methyl cellulose) 4.6% by weight, a lubricant (UNILUB available from NOF Corp.) 2.8% by weight, glycerin 1.3% by weight, and water 13.8% by weight to prepare a mixture composition. This mixture composition was then extrusion-molded to manufacture raw honeycomb molded bodies with unplugged cells, having the same shapes as those of the honeycomb fired body 111, the honeycomb fired body 112, and the honeycomb fired body 113 illustrated in FIG. 2A, FIG. 2B, and FIG. 2C.

(Manufacturing of Honeycomb Fired Bodies)

The raw honeycomb molded bodies were dried with a micro-wave drier to manufacture honeycomb dried bodies. Into specific cells of these honeycomb dried bodies, a paste having the same composition as the above mixture composition was plugged, and the resulting product was dried again with a micro-wave drying apparatus.

The dried honeycomb molded bodies were degreased at 400° C., and fired at 2200° C. in a normal-pressure argon atmosphere for 3 hours to manufacture honeycomb fired bodies having shapes of FIG. 2A, FIG. 2B, and FIG. 2C. The resulting honeycomb fired bodies were composed of silicon carbide sintered bodies that had a porosity of 45%, an average pore diameter of 15 μm, the number of cells (cell density) of 300 pieces/inch$^2$, a cell wall thickness of 0.25 mm (10 mil).

(Combining and Fixing the Honeycomb Fired Bodies)

The present example 1 employed a dense stainless steel molding frame having a shape illustrated in FIG. 4. A paper member was disposed on the inner face side of the molding frame. The paper member was attached to the inner face of the molding frame with a double-faced tape.

The dense stainless steel molding frame was 158 mm in outer diameter, 142.8 mm in inner diameter, and 7.6 mm in thickness. The paper member was a silicon-treated glassine paper in which a silicon-containing separation layer is formed on a glassine paper. This paper member had an air permeability of 6.0 cc/cm$^2$/sec and a thickness of 0.075 mm.

Inside the molding frame, as illustrated in FIG. 4, 16 pieces of the honeycomb fired bodies were combined with a spacer therebetween into a round pillar shape in such a manner that the honeycomb fired bodies are in parallel with one another in the longitudinal direction and the both end faces are in the same plane. The distance between the combined honeycomb fired bodies and the inner face of the molding frame was 1.0 mm, and the distance between the combined honeycomb fired bodies and the paper member (d3 in FIG. 4) was 0.925 mm.

(Filing of Sealing Material Paste)

A paste-supplying apparatus illustrated in FIG. 5A and FIG. 5B was mounted on the molding frame, and a sealing material paste was charged into a paste chamber of the apparatus. As illustrated in FIG. 6A and FIG. 6B, the sealing material paste was filled into a gap between the molding frame and the honeycomb fired bodies and gaps between the honeycomb fired bodies.

The sealing material paste was a heat-resistant sealing material paste including an amount of 30% by weight of alumina fibers with an average fiber length of 20 μm, 21% by weight of silicon carbide particles with an average particle diameter of 0.6 μm, 15% by weight of silica sol (solid contents of 30% by weight), 5.6% by weight of carboxymethylcellulose, and 28.4% by weight of water.

(Drying of Sealing Material Paste)

Next, the molding frame into which the sealing material paste had been filled was heated at 120° C., thereby drying the sealing material paste. After the sealing material paste was solidified, the molding frame was disassembled. Thus, a round pillar-shaped honeycomb structure (see FIG. 1) was manufactured.

The coat layer surface of the manufactured honeycomb structure was visually observed and touched by finger, which found that the coat layer surface had no floury texture. In addition, the coat layer was observed with SEM to reveal that the proportion of the inorganic particles present in the surface side of the coat layer was substantially equal to the proportion of the inorganic particles present in the honeycomb fired body side of the coat layer, and the proportion of the inorganic fibers present in the surface side of the coat layer was substantially equal to the proportion of the inorganic fibers present in the honeycomb fired body side of the coat layer, and that no migration in the coat layer was observed.

Comparative Example 1

In the present comparative example 1, no paper member was disposed on the inner face side of the molding frame. Used was a molding frame the entire of which was made of dense stainless steel and whose inner face was coated with fluorine resin in order to improve frame-releasability. Except for these, a honeycomb structure was manufactured in the same manner as in the above example 1.

The coat layer of the manufactured honeycomb structure was observed to reveal that the proportion of the inorganic particles present in the surface side of the coat layer was smaller than the proportion of the inorganic particles present in the honeycomb fired body side of the coat layer, and the proportion of the inorganic fibers present in the surface side of the coat layer was smaller than the proportion of the inorganic fibers present in the honeycomb fired body side of the coat layer, and that migration was generated. Further, the coat layer surface had a floury texture. The reason for this is mentioned below with reference to FIG. 8A and FIG. 8B. Members whose configurations are identical to those illustrated in FIG. 7A and FIG. 7B are labeled with identical referential numerals, and explanations thereof are omitted.

Figure 8A:
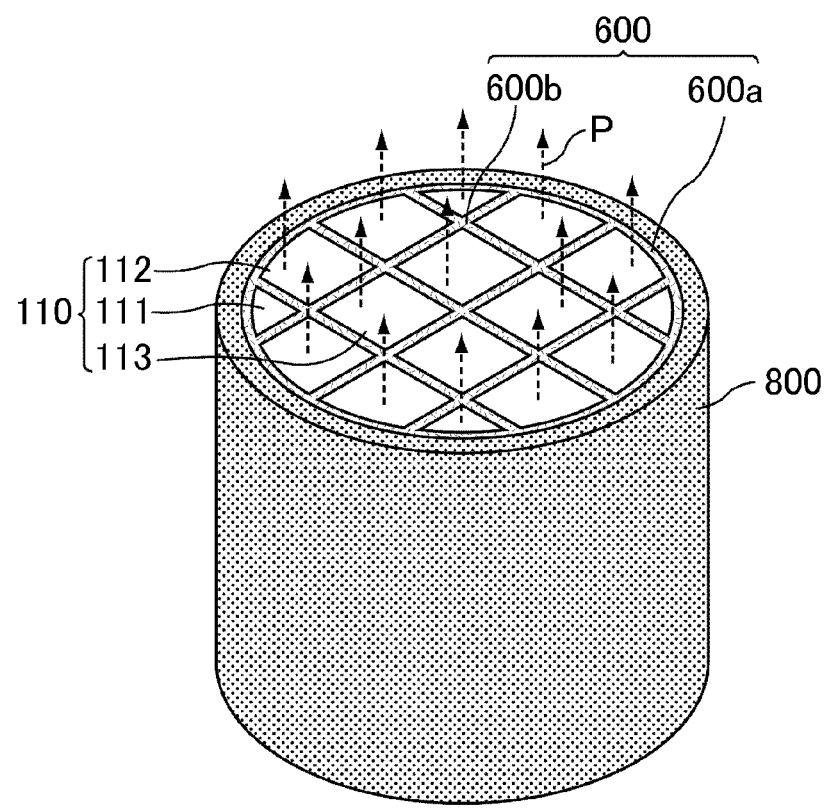
FIG. 8A is a perspective view schematically illustrating the state of a molding frame in drying (S5) of comparative example 1.

FIG. 8A is a perspective view schematically illustrating the state of the molding frame in drying (S5) of comparative example 1.

Figure 8B:
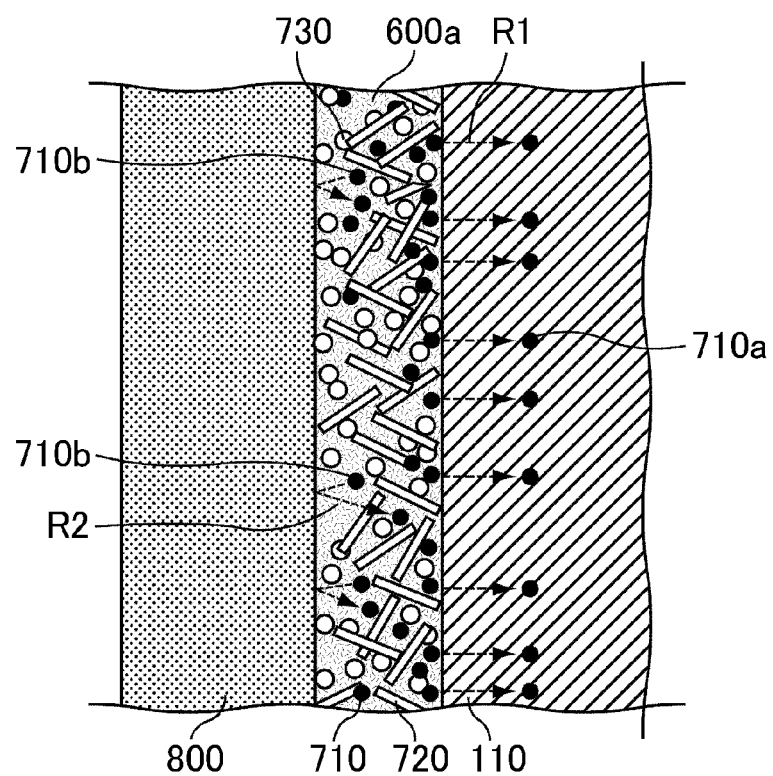
FIG. 8B is a cut-away cross-sectional view along the direction perpendicular to the longitudinal direction of honeycomb fired bodies, schematically illustrating movement of moisture contained in a sealing material paste that is in contact with the inner face of the molding frame in the drying (S5) of comparative example 1.

FIG. 8B is a cut-away cross-sectional view along the direction perpendicular to the longitudinal direction of the honeycomb fired bodies, schematically illustrating movement of moisture contained in the sealing material paste that is in contact with the inner face of the molding frame in drying (S5) of comparative example 1. In FIG. 8B, the arrow R1 and the arrow R2 each show a movement direction of moisture contained in the sealing material paste 600a.

The present comparative example 1 employs a molding frame 800 the entire of which is made of dense stainless steel and no paper member was disposed on the inner face side of the molding frame 800, so that the entire molding frame 800 and the inner face side of the molding frame 800 have no air permeability.

In the drying (S5), moisture contained in the sealing material paste 600b, which is filed into the gaps 210 between the honeycomb fired bodies 110, is discharged from the end faces of the honeycomb fired bodies 110 to the outside (the direction shown by the arrow P), similarly in the above first embodiment of the present invention.

However, moisture contained in the sealing material paste 600a, which is filled into the gap between the inner face of the molding frame 800 and the honeycomb fired bodies 110, moves as follows. As illustrated in FIG. 8B, steam 710a having moved to the honeycomb fired body 110 side passes through the honeycomb fired body 110 as indicated by the arrow R1, and then is discharged to the outside. Steam 710b having tried to move to the molding frame 800 can not pass through the molding frame 800 as indicated by the arrow R2, and moves to the honeycomb fired body 110 side. Accordingly, moisture contained in the sealing material paste 600a entirely moves to the honeycomb fired body 110 side. Along with this, the inorganic fibers 720 and the inorganic particles 730 move to the honeycomb fired body 110 side, and bias of the movement direction of the inorganic fibers 720 and the inorganic particles 730 in the sealing material paste 600a tends to be generated. As a result, migration occurs in the obtained coat layer.

The above results revealed that when the member including the vent portion is disposed on the inner face side of the molding frame that is in contact with the sealing material paste, moisture in the sealing material paste can be discharged to the outside through the vent portion as well as from the honeycomb fired body side. This makes it possible to manufacture a honeycomb structure in which migration is less likely to occur and the surface strength is excellent.

Second Embodiment

Hereinafter, a second embodiment, one embodiment of the method for manufacturing the honeycomb structure of the present invention, will be mentioned.

The present embodiment is mentioned with reference to an example case where a nonwoven fabric is disposed as a member including a vent portion, instead of the paper, which configures the member including the vent portion in the first embodiment of the present invention.

The honeycomb structure manufactured in the present embodiment has substantially the same configuration as in the first embodiment of the present invention, and detail explanation thereof is omitted. Further, members whose configurations are identical to those in the first embodiment of the present invention are labeled with identical referential numerals, and explanations thereof are omitted.

Figure 9A:
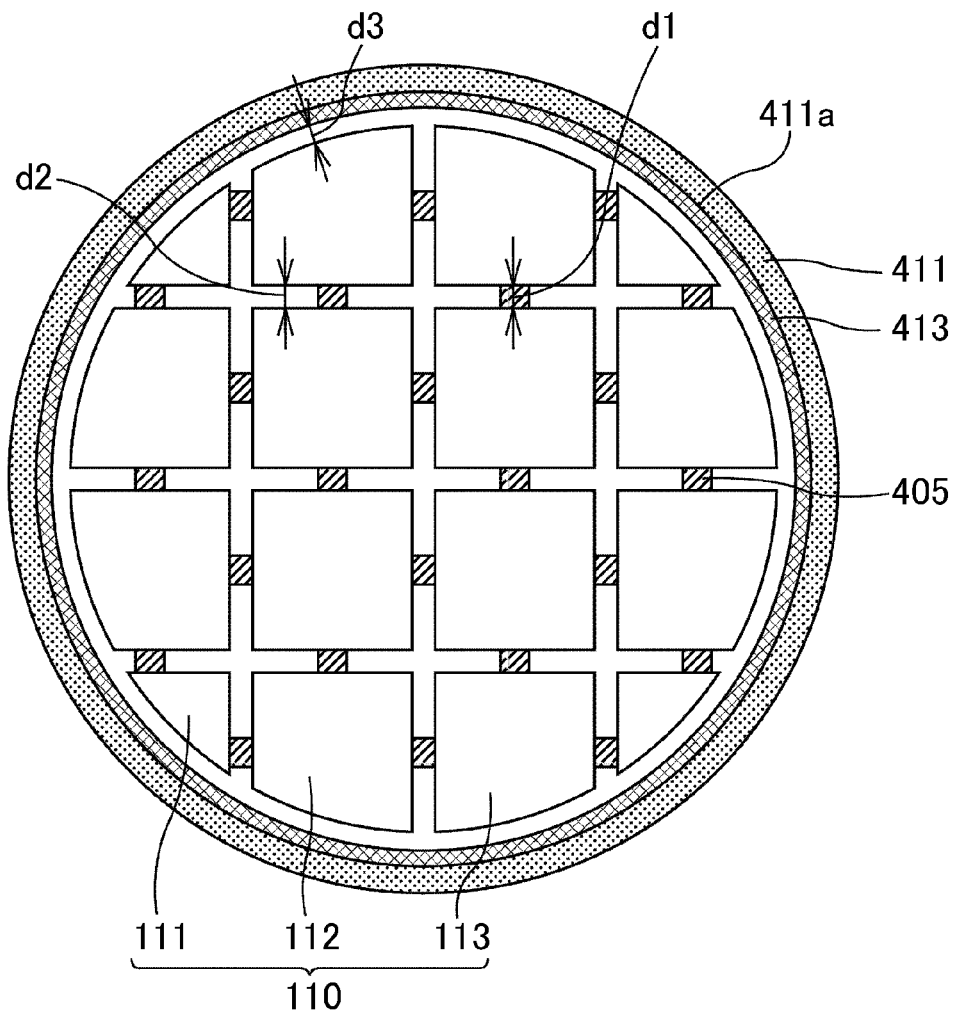
FIG. 9A is a cross-sectional view along the direction perpendicular to the longitudinal direction of honeycomb fired bodies, schematically illustrating the state where the honeycomb fired bodies are disposed inside a molding frame in a second embodiment of the present invention.

FIG. 9A is a cross-sectional view along the direction perpendicular to the longitudinal direction of the honeycomb fired bodies, schematically illustrating the state where the honeycomb fired bodies are disposed inside the molding frame in the second embodiment of the present invention.

In FIG. 9A, a nonwoven fabric 413 as a member including a vent portion is disposed on an inner face side of the molding frame 411 that has the same configuration as in the above first embodiment includes. The nonwoven fabric 413 is fixed to the inner face side of the molding frame 411 with a double-faced tape.

The nonwoven fabric 413 is excellent in dimensional stability, and is less likely to expand or contract even when absorbing water (moisture), and hardly creases. Accordingly, a resulting coat layer hardly has irregularities on its surface. The nonwoven fabric 413 has a large pore diameter and a high porosity, and has less closed pores but has open pores, which allows a high air permeability. Therefore, the nonwoven fabric 413 is desirable as a member including a vent portion of the present invention.

The air permeability of the nonwoven fabric 413 is desirably about 0.05 $cc/cm^2/sec$ or more, more desirably in the range from about 0.05 $cc/cm^2/sec$ to about 100 $cc/cm^2/sec$, still more desirably in the range from about 1 $cc/cm^2/sec$ to about 100 $cc/cm^2/sec$, and further desirably in the range from about 5 $cc/cm^2/sec$ to about 100 $cc/cm^2/sec$.

The average pore diameter of the nonwoven fabric 413 is desirably about 0.1 μm to about 50 μm, and more desirably about 0.1 μm to about 5 μm. The average pore diameter means a diameter in the case where the pore has a circular shape, and means a maximum diameter in the case where the pore has a shape other than the circular shape.

Examples of fiber materials for the nonwoven fiber 413 include polyester, acryl, polypropylene, polyethylene, polyester, polyolefin, aramid, vinylon, rayon, and the like. In the present embodiment, a polyester fiber nonwoven fabric can be desirably used as a member including a vent portion.

Figure 9B:
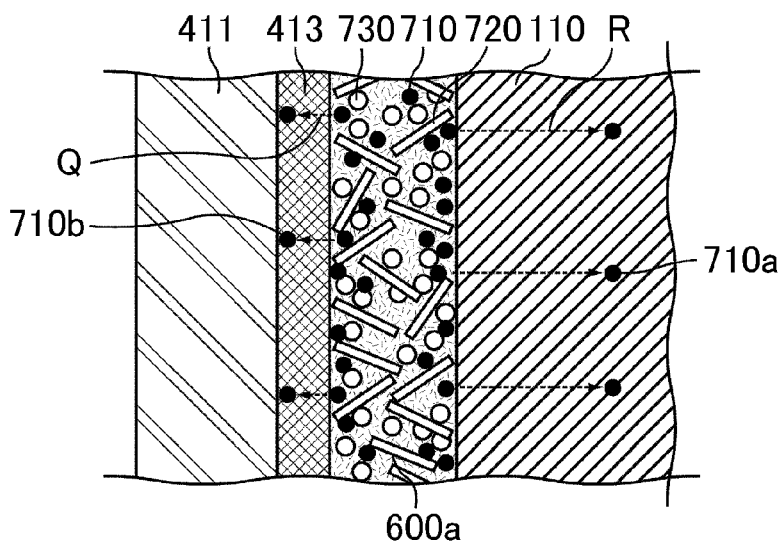
FIG. 9B is a cut-away cross-sectional view along the direction perpendicular to the longitudinal direction of the honeycomb fired bodies, schematically illustrating movement of moisture contained in a sealing material paste that is in contact with the inner face side of the molding frame in the second embodiment of the present invention.

FIG. 9B is a cut-away cross-sectional view along the direction perpendicular to the longitudinal direction of the honeycomb fired bodies, schematically illustrating movement of moisture contained in the sealing material paste that is in contact with the inner face side of the molding frame in the second embodiment of the present invention.

In FIG. 9B, moisture 710 in the sealing material paste 600a becomes steam by heating, and steam 710a, which is part of the steam, moves to the honeycomb fired body 110 side as indicated by the arrow R, and then is discharged from the end face of the honeycomb fired body 110 to the outside. Steam 710b, which is part of the steam, moves to the nonwoven fabric 413 side as indicated by the arrow Q, and then is kept in the nonwoven fabric 413 or discharged from the end face of the nonwoven fabric 413 to the outside together with steam-containing air.

Accordingly, also in the second embodiment of the present invention, bias of the movement direction of the moisture 710 contained in the sealing material paste 600a tends not to occur, so that generation of migration upon drying the sealing material paste tends to be suppressed in the same manner, as in the first embodiment of the present invention.

In the present embodiment, the effects (1) to (4) mentioned in the first embodiment of the present invention can be exhibited.

Hereinafter, an example that more specifically discloses the second embodiment of the present invention is mentioned. The present invention is not limited to only this example.

Example 2

In the present example 2, a wet nonwoven fabric (product of AWA PAPER MFG. CO., LTD., Part No. PY120-03) made of 100% polyester fiber was disposed as a nonwoven fabric that constitutes a member including a vent portion. The wet nonwoven fabric had an air permeability of 6.0 cc/cm²/sec, a thickness of 0.09 mm, an average pore diameter of 14.2 μm, and an average fiber diameter of 28 μm.

The distance between the combined honeycomb fired bodies and the inner face of the molding frame was 1.0 mm, and the distance (corresponding to d3 in FIG. 9A) between the combined honeycomb fired bodies and the nonwoven fabric was 0.91 mm.

Except for these, a honeycomb structure was manufactured in the same manner as in example 1.

The coat layer surface of the manufactured honeycomb structure was visually observed and touched by finger, which found that the coat layer surface had no floury texture. In addition, the coat layer was observed with SEM to reveal that the proportion of the inorganic particles present in the surface side of the coat layer was substantially equal to the proportion of the inorganic particles present in the honeycomb fired body side of the coat layer, and the proportion of the inorganic fibers present in the surface side of the coat layer was substantially equal to the proportion of the inorganic fibers present in the honeycomb fired body side of the coat layer, and that no migration in the coat layer was observed.

Third Embodiment

Hereinafter, a third embodiment, one embodiment of the method for manufacturing the honeycomb structure of the present invention, will be mentioned.

The present embodiment is mentioned with reference to an example case where a paper is further disposed as a member including a vent portion on the inner face side of a porous metal molding frame with air permeability. Specifically, in the present embodiment, the entire molding frame and the paper member disposed on the inner side of the molding frame both have air permeability. The paper member that is disposed on the inner face side of the molding frame also plays a role of suppressing movement of inorganic particles and inorganic fibers contained in the coat layer to enhance surface smoothness of the coat layer.

The entire molding frame including a vent portion means that the body of the molding frame that holds the combined honeycomb fired bodies has air permeability, and may have a portion with no air permeability such as a portion connected to the apparatus for supplying the sealing material paste unless the effects of the present embodiment are sacrificed.

The honeycomb structure manufactured in the present embodiment has the same configuration as in the honeycomb structure of the first embodiment of the present invention, so that detail explanation thereof is omitted. Further, members whose configurations are substantially identical to those in the above respective embodiments are labeled with identical referential numerals, and explanations thereof are omitted.

Figure 10A:
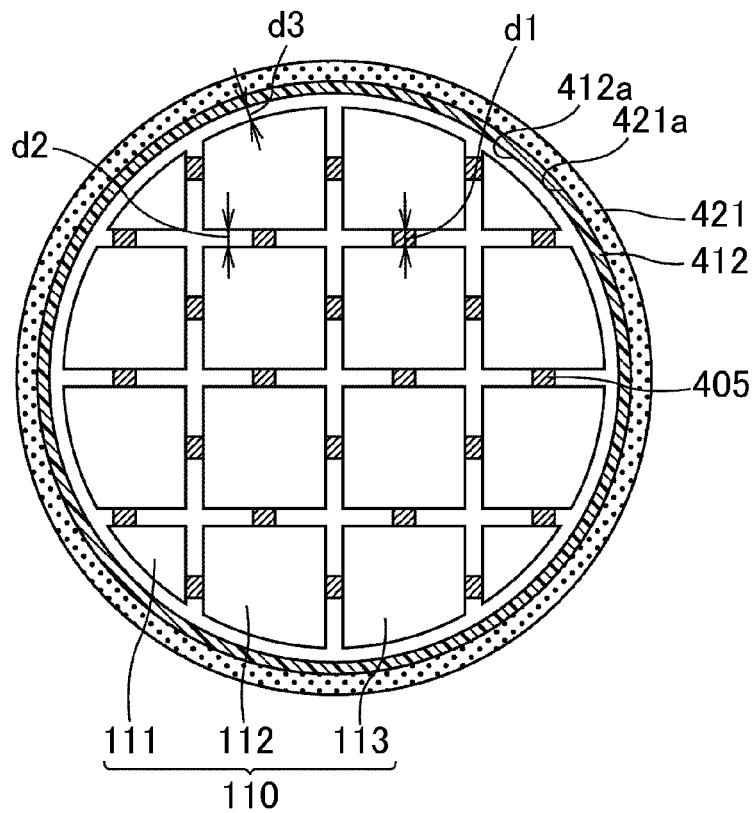
FIG. 10A is a cross-sectional view along the direction perpendicular to the longitudinal direction of honeycomb fired bodies, schematically illustrating the state where the honeycomb fired bodies are disposed inside a molding frame in a third embodiment of the present invention.

FIG. 10A is a cross-sectional view along the direction perpendicular to the longitudinal direction of the honeycomb fired bodies, schematically illustrating the state where the honeycomb fired bodies are disposed inside a molding frame in the third embodiment of the present invention.

A molding frame 421 in FIG. 10A is a porous metal frame the entire of which is made of a porous metal.

Examples of the porous metal include foam metals, nonwoven metal fabrics, and the like. Here, a molding frame made of a foam metal is taken as an example. The metal nonwoven fabric can be formed into a molding frame shape by laminating a plurality of metal nonwoven fabrics and securing them to one another by pot welding, and thus-obtained metal nonwoven fabric has a strength as a molding frame.

The pore diameter of the porous metal is desirably from about 50 μm to about 600 μm, and more desirably in the range from about 300 μm to about 600 μm. The porous metal has such fine pores (continuous pores), and the porosity is desirably from about 80% to about 97%, and more desirably in the range from about 94% to about 97%.

Specific examples of the porous metal include copper, nickel, stainless steel, or an alloy composed of at least one of copper, nickel, and stainless steel.

The molding frame 421 has fine pores as mentioned above, so that the entire molding frame 421, including the inner face 421a side thereof, has air permeability. The molding frame 421 having such a configuration is made of a porous metal, and therefore, has strength high enough to fix the honeycomb fired bodies. Accordingly, the molding frame 421 of the third embodiment of the present invention has both air permeability and strength.

On the inner face side of the molding frame 421, a paper 412 is disposed. A paper similar to the one mentioned in the first embodiment of the present invention can be used as the paper 412, and attached to the inner face 421a of the molding frame 421 with a double-faced tape.

Figure 10B:
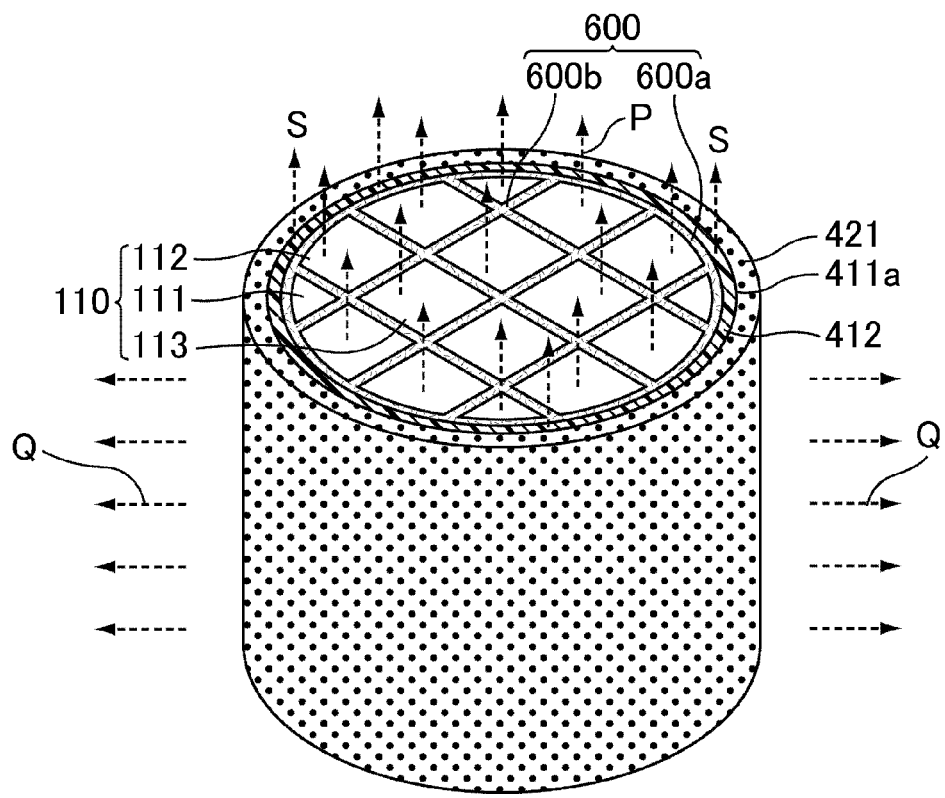
FIG. 10B is a perspective view schematically illustrating the state of the molding frame in drying (S5) in the third embodiment of the present invention.
Figure 11A:
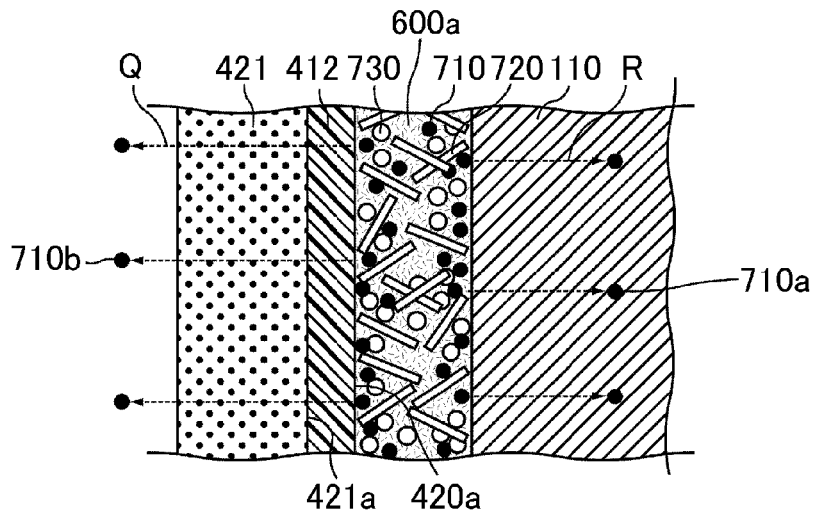
FIG. 11A is a cut-away cross-sectional view along the direction perpendicular to the longitudinal direction of the honeycomb fired bodies, schematically illustrating movement of moisture contained in a sealing material paste that is in contact with the inner face side of the molding frame in the third embodiment of the present invention.

FIG. 10B is a perspective view schematically illustrating the state of the molding frame in drying (S5) in the third embodiment of the present invention. FIG. 11A is a cut-away cross-sectional view along the direction perpendicular to the longitudinal direction of the honeycomb fired bodies, schematically illustrating movement of moisture contained in a sealing material paste that is in contact with the inner face side of the molding frame in the third embodiment of the present invention.

As illustrated in FIG. 10B and FIG. 11A, moisture 710 in the sealing material paste 600a becomes steam by heating, and steam 710a, which is part of the steam, moves to the honeycomb fired body 110 side as indicated by the arrow R, and then is discharged from the end face of the honeycomb fired body 110 to the outside as indicated by the arrow P. Steam 710b, which is part of the steam, passes through the paper 412 and the molding frame 421, and then is discharged to the outside as indicated by the arrow Q. Steam 710b, which is part of the steam and has moved to the paper 412 side, is discharged to the outside from the end face of the paper 412 as indicated by the arrow S.

Accordingly, even if the molding frame 421 of the third embodiment of the present invention is used, bias of the movement direction of the moisture 710 contained in the sealing material paste 600a tends not to occur, so that generation of migration upon drying the sealing material paste tends to be suppressed, as in the first embodiment of the present invention.

In the third embodiment of the present invention, the molding frame 421 made of a porous metal has strength high enough as a molding frame for fixing the honeycomb fired bodies, and further includes a vent portion with air permeability. Accordingly, use of only the molding frame 421 is enough to more easily suppress generation of migration in the coat layer as in the first and second embodiments of the present invention.

However, the porous metal generally has a pore diameter that is much larger than an average particle diameter of the inorganic particles and an average fiber diameter of the inorganic fibers contained in the coat layer. Accordingly, when the inorganic particles and the inorganic fibers move to the surface side of the coat layer along with movement of moisture contained in the coat layer upon drying the sealing material paste, irregularities tend to be slightly generated on the coat layer surface.

According to the present embodiment, the paper member including the vent portion with an average pore diameter relatively smaller than the pore diameter of the porous metal is disposed on the inner face side of the porous metal molding frame. In this case, upon drying the sealing material paste, the paper 412 is permeable to air (steam) smaller than the pore diameter and allows movement of the air to the molding frame side, but is less permeable to the inorganic particles and the inorganic fibers to more easily suppress movement of the particulars and fibers.

Accordingly, in the present embodiment, surface irregularities formed due to the inorganic particles and/or the inorganic fibers tends to be eliminated, and a coat layer excellent in surface smoothness can be obtained.

In addition, the paper 412 is excellent also in releasability, and therefore may be more easily separated from the honeycomb structure after release from the molding frame. As a result, the frame-releasability of the honeycomb structure tends to be enhanced.

According to the present embodiment, the effects (1), (3), and (4) described in the first embodiment of the present invention can be exhibited, and the following effect can be exhibited.

(5) According to the method for manufacturing the honeycomb structure body of the third embodiment of the present invention, both the porous metal molding frame and the paper member disposed on the inner face side of the molding frame include the vent portion, and therefore, air permeability tends to be provided by the porous metal molding frame and the paper member.

Hereinafter, an example that more specifically discloses the third embodiment of the present invention will be mentioned. The present invention is not limited to only this example.

Example 3

In the present example 3, a molding frame with a shape illustrated in FIG. 10A, the entire of which is made of a porous metal was used. The porous metal is a foam stainless steel metal (product of MITSUBISHI MATERIALS Corp., standard porosity of 95% to 97%). The molding frame was 158 mm in outer diameter, 142.8 mm in inner diameter, and 7.6 mm in thickness, and had an air permeability of 6.0 cc/cm$^2$/sec.

A paper similar to the one mentioned in example 1 was used as the paper member disposed on the inner face side of the molding frame.

The distance between the combined honeycomb fired bodies and the inner face of the molding frame was 1.0 mm, and the distance (corresponding to d3 in FIG. 10A) between the combined honeycomb fired bodies and the paper was 0.925 mm.

Except for this, a honeycomb structure with a shape illustrated in FIG. 1 was manufactured in the same manner as in example 1.

The coat layer surface of the manufactured honeycomb structure was visually observed and touched by finger, which found that the coat layer surface had no floury texture. In addition, the coat layer was observed with SEM to reveal that the proportion of the inorganic particles present in the surface side of the coat layer was substantially equal to the proportion of the inorganic particles present in the honeycomb fired body side of the coat layer, and the proportion of the inorganic fibers present in the surface side of the coat layer was substantially equal to the proportion of the inorganic fibers present in the honeycomb fired body side of the coat layer, and that no migration in the coat layer was observed.

Fourth Embodiment

Hereinafter, a fourth embodiment, one embodiment of the method for manufacturing the honeycomb structure of the present invention, will be described.

The present embodiment has a configuration in which a nonwoven fabric member is used instead of the paper member in the third embodiment of the present invention. The other members have substantially the same configurations as in the third embodiment of the present invention, and therefore detail explanations thereof are omitted. Members whose configurations are identical to those illustrated in the above respective embodiments are labeled with identical referential numerals, and explanations thereof are omitted.

The nonwoven fabric member is the same as the second embodiment of the present invention. The nonwoven fabric member is attached to the inner face side of the molding frame with a double-faced tape.

In the fourth embodiment of the present invention, the molding frame made of a porous metal has strength high enough as a molding frame for fixing the honeycomb fired bodies, and also includes a vent portion with air permeability. Specifically, in the present embodiment, the molding frame and the nonwoven fabric member both include the vent portion.

In addition, the nonwoven fabric member that is disposed on the inner face side of the molding frame includes a vent portion, and also can improve the frame-releasability. Further, the vent portion of the nonwoven fabric member has an average pore diameter relatively smaller than the pore diameter of the porous metal. Thus, upon drying the sealing material paste, the nonwoven fabric member is permeable to air (steam) smaller than the pore diameter and tends to allow movement of the air to the molding frame side, but is less permeable to the inorganic particles and the inorganic fibers to suppress movement of the particles and fibers.

Accordingly, in the present embodiment, surface irregularities formed due to the inorganic particles and/or the inorganic fibers tend to be eliminated, and a coat layer excellent in surface smoothness tends to be obtained.

In addition, the nonwoven fabric member is excellent also in releasability, and therefore may be more easily separated from the honeycomb structure after release from the molding frame. As a result, the frame-releasability of the honeycomb structure tends to be enhanced.

Figure 11B:
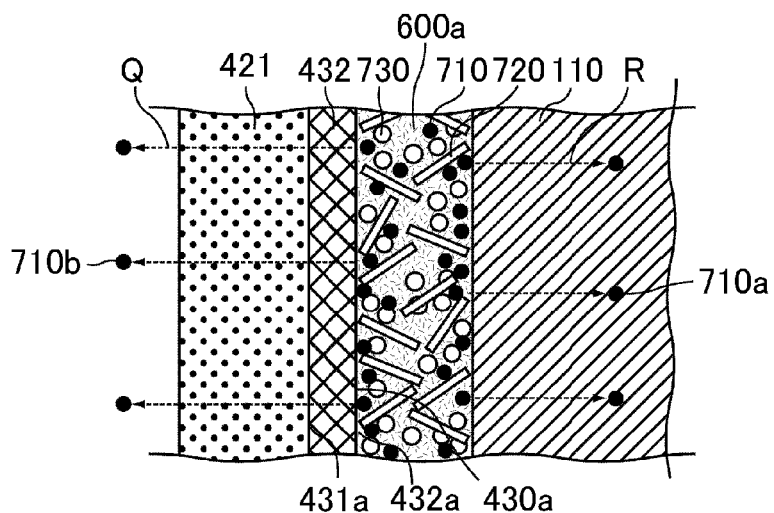
FIG. 11B is a cut-away cross-sectional view along the direction perpendicular to the longitudinal direction of honeycomb fired bodies, schematically illustrating movement of moisture contained in a sealing material paste that is in contact with the inner face side of a molding frame in a fourth embodiment of the present invention.

FIG. 11B is a cut-away cross-sectional view along the direction perpendicular to the longitudinal direction of the honeycomb fired bodies, schematically illustrating movement of moisture contained in a sealing material paste that is in contact with the inner face side of the molding frame in the fourth embodiment of the present invention.

In FIG. 11B, moisture 710 in the sealing material paste 600a becomes steam by heating, and steam 710a, which is part of the steam, moves to the honeycomb fired body 110 side as indicated by the arrow R, and then is discharged from the end face of the honeycomb fired body 110 to the outside. Steam 710b, which is part of the steam, passes through the nonwoven fabric 432 and the molding frame 421 and moves in the arrow Q direction and then is discharged to the outside. The steam 710b, which is part of the steam and has moved to the nonwoven fabric 432 side, is discharged to the outside from the end face of the nonwoven fabric 432 like the steam that is discharged from the end face of the paper member in the third embodiment of the present invention.

Accordingly, also in the fourth embodiment of the present invention, bias of the movement direction of the moisture 710 contained in the sealing material paste 600a tends not to occur, so that generation of migration upon drying the sealing material paste tends to be suppressed, as in the third embodiment of the present invention.

In the present embodiment, the following effect as well as the effects (1), (3), and (4) mentioned in the first embodiment of the present invention can be exhibited.

(6) According to the method for manufacturing the honeycomb structure in accordance with the fourth embodiment of the present invention, both the porous metal molding frame and the nonwoven fabric member disposed on the inner face side of the molding frame include the vent portion, and therefore, air permeability tends to be provided by the porous metal molding frame and the nonwoven fabric member.

Hereinafter, an example that more specifically discloses the fourth embodiment of the present invention will be mentioned. The present invention is not limited to only this example.

Example 4

In the present example 4, the same porous metal molding frame as in example 3 was used as a molding frame.

A nonwoven fabric similar to the one mentioned in example 2 was used as a nonwoven fabric member disposed on the inner face side of the molding frame.

The distance between the combined honeycomb fired bodies and the inner face of the molding frame was 1.0 mm, and the distance (corresponding to d3 in FIG. 10A) between the combined honeycomb fired bodies and the nonwoven fabric member was 0.91 mm.

Except for these, a honeycomb structure with a shape illustrated in FIG. 1 was manufactured in the same manner as in example 1.

The coat layer surface of the manufactured honeycomb structure was visually observed and touched by finger, which found that the coat layer surface had no floury texture. In addition, the coat layer was observed with SEM to reveal that the proportion of the inorganic particles present in the surface side of the coat layer was substantially equal to the proportion of the inorganic particles present in the honeycomb fired body side of the coat layer, and the proportion of the inorganic fibers present in the surface side of the coat layer was substantially equal to the proportion of the inorganic fibers present in the honeycomb fired body side of the coat layer, and that no migration in the coat layer was observed.

Fifth Embodiment

Hereinafter, a fifth embodiment, one embodiment of the method for manufacturing the honeycomb structure of the present invention, will be described.

The present embodiment has a configuration in which a mesh member is used instead of the paper member in the third embodiment of the present invention. The other members have the same configurations as in the third embodiment of the present invention, and therefore detail explanations thereof are omitted. Members whose configurations are substantially identical to those illustrated in the above respective embodiments are labeled with identical referential numerals, and explanations thereof are omitted.

Examples of the mesh member as a member including a vent portion include metal mesh members, resin mesh members, and the like.

Examples of the metal mesh members include meshes of stainless steel, nickel, titanium, copper, zinc, and the like. Among these, a stainless steel mesh member is desirable because it has resistant to corrosion and is easily available.

Examples of the resin mesh members include meshes of PA (polyamide), PET (polyethylene terephthalate), PP (polypropylene), PE (polyethylene), PPS (polyphenylene sulfide), fluorine resins, and the like. In the present embodiment, it is desirable that a resin mesh member that has heat resistance above drying temperature for the coat layer is used.

The air permeability of the mesh member is desirably about 0.05 cc/cm$^2$/sec or more, more desirably in the range from about 0.05 cc/cm$^2$/sec to about 100 cc/cm$^2$/sec, still more desirably in the range from about 1 cc/cm$^2$/sec to about 100 cc/cm$^2$/sec, and further desirably in the range from about 5 cc/cm$^2$/sec to about 100 cc/cm$^2$/sec.

As the mesh member, a member with small mesh openings is desirable, and for example, a member with a mesh opening of about 325 to about 795 mesh can be used. As one example, when a stainless steel mesh is used, it may be a twill weave or plain weave, and a stainless steel mesh with a wire diameter of about 0.015 mm to about 0.035 mm, an opening of about 0.016 mm to about 0.062 mm, and an aperture of about 24.9% to about 60.0% is desirably used.

Here, the mesh member in the present description includes a punched metal member.

The punched metal member is a metal plate with a large number of holes formed in a regular array. The hole shape, pitch, opening diameter, and the like are not especially limited provided that the punched metal member satisfies the above air permeability.

Hereinafter, the case where a stainless steel mesh is used as the mesh member is mentioned as an example.

The stainless steel mesh member has a substantially cylindrical (tube) shape with an inner diameter that is slightly smaller than the inner diameter of the molding frame in view of its thickness so as to be in contact with the inner face of the molding frame when being disposed on the inner face side of the molding frame. The stainless steel mesh member with such a shape has self-supporting property, and therefore can configure a vent portion just by being disposed on the inner face side of the molding frame.

In the fifth embodiment of the present invention, the molding frame made of a porous metal has strength high enough as a molding frame for fixing the honeycomb fired bodies, and also includes a vent portion with air permeability. Specifically, in the present embodiment, the molding frame and the stainless steel mesh member both include the vent portion.

In addition, the stainless steel mesh member disposed on the inner face side of the molding frame includes a vent portion, and also can improve the frame-releasability. Further, when the stainless steel mesh member has an opening relatively smaller than the pore diameter of the porous metal, upon drying the sealing material paste, the stainless steel mesh member is permeable to air (steam) and allows movement of the air to the molding frame side, but is less permeable to the inorganic particles and the inorganic fibers to more easily suppress movement of the particles and fibers.

Accordingly, in the present embodiment, surface irregularities formed due to the inorganic particles and/or the inorganic fibers tend to be eliminated, and a coat layer excellent in surface smoothness tends to be obtained.

Figure 11C:
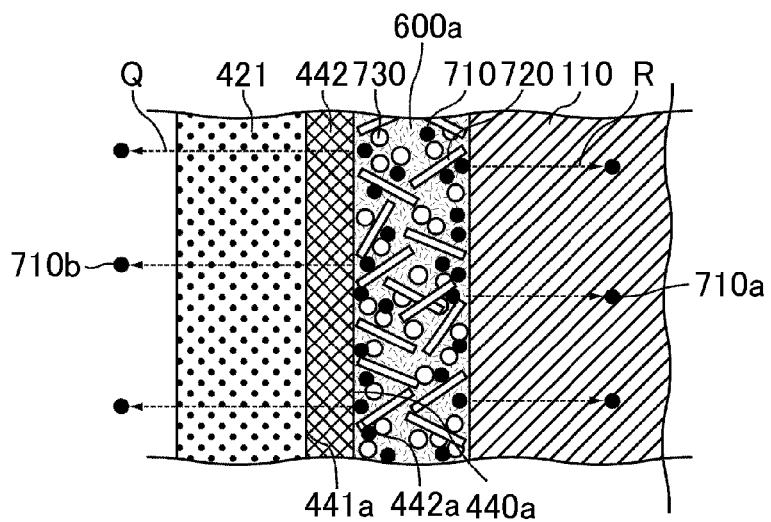
FIG. 11C is a cut-away cross-sectional view along the direction perpendicular to the longitudinal direction of honeycomb fired bodies, schematically illustrating movement of moisture contained in a sealing material paste that is in contact with the inner face side of a molding frame in a fifth embodiment of the present invention.

FIG. 11C is a cut-away cross-sectional view along the direction perpendicular to the longitudinal direction of the honeycomb fired bodies, schematically illustrating movement of moisture contained in the sealing material paste that is in contact with the inner face side of the molding frame in the fifth embodiment of the present invention.

In FIG. 11C, moisture 710 in the sealing material paste 600a becomes steam by heating, and steam 710a, which is part of the steam, moves to the honeycomb fired body 110 side as indicated by the arrow R, and then is discharged from the end face of the honeycomb fired body 110 to the outside. Steam 710b, which is part of the steam, passes through a stainless steel mesh 442 and the molding frame 421 and moves in the arrow Q direction and then is discharged to the outside.

Accordingly, also in use of the molding frame 421 and stainless steel mesh 442 in accordance with the fifth embodiment of the present invention, bias of the movement direction of the moisture 710 contained in the sealing material paste 600a tends not to occur, so that generation of migration upon drying the sealing material paste tends to be suppressed, as in the first embodiment of the present invention.

In the present embodiment, the following effect as well as the effects (1), (3), and (4) mentioned in the first embodiment of the present invention can be exhibited.

(7) According to the method for manufacturing the honeycomb structure in accordance with the fifth embodiment of the present invention, both the porous metal molding frame and the mesh member disposed on the inner face side of the molding frame include the vent portion, and therefore air permeability may be provided more easily by the porous metal molding frame and the mesh member.

Hereinafter, an example that more specifically discloses the fifth embodiment of the present invention will be mentioned. The present invention is not limited to only this example.

Example 5

In the present example 5, a porous metal molding frame similar to the one mentioned in example 3 was used as a molding frame.

A stainless steel mesh member was disposed on the inner face side of the molding frame. The stainless steel mesh member is a 795 mesh with a wire diameter of 0.016 mm, an opening of 0.016 mm, an aperture of 24.9%, and air permeability of 0.05 $cc/cm^2/sec$ or more.

The distance between the combined honeycomb fired bodies and the inner face of the molding frame was 1.0 mm, and the distance (corresponding to d3 in FIG. 9A) between the combined honeycomb fired bodies and the stainless steel mesh member was 0.984 mm.

Except for these, a honeycomb structure was manufactured in the same manner as in example 1.

The coat layer surface of the manufactured honeycomb structure was visually observed and touched by finger, which found that the coat layer surface had no floury texture. In addition, the coat layer was observed with SEM to reveal that the proportion of the inorganic particles present in the surface side of the coat layer was substantially equal to the proportion of the inorganic particles present in the honeycomb fired body side of the coat layer, and the proportion of the inorganic fibers present in the surface side of the coat layer was substantially equal to the proportion of the inorganic fibers present in the honeycomb fired body side of the coat layer, and that no migration in the coat layer was observed.

Sixth Embodiment

Hereinafter, a sixth embodiment, one embodiment of the method for manufacturing the honeycomb structure of the present invention, will be described.

According to the third to fifth embodiments of the present invention, a porous metal molding frame, and a paper member, a nonwoven fabric member, or stainless steel mesh member disposed on the inner face side of the molding frame include the vent portion. The present embodiment is mentioned with reference to an example case where only a porous metal molding frame includes the vent portion. The other members have the same configuration as in the third to fifth embodiments of the present invention, and therefore detail explanations thereof are omitted. Members whose configurations are substantially identical to those illustrated in the above respective embodiments are labeled with identical referential numerals, and explanations thereof are omitted.

Figure 12:
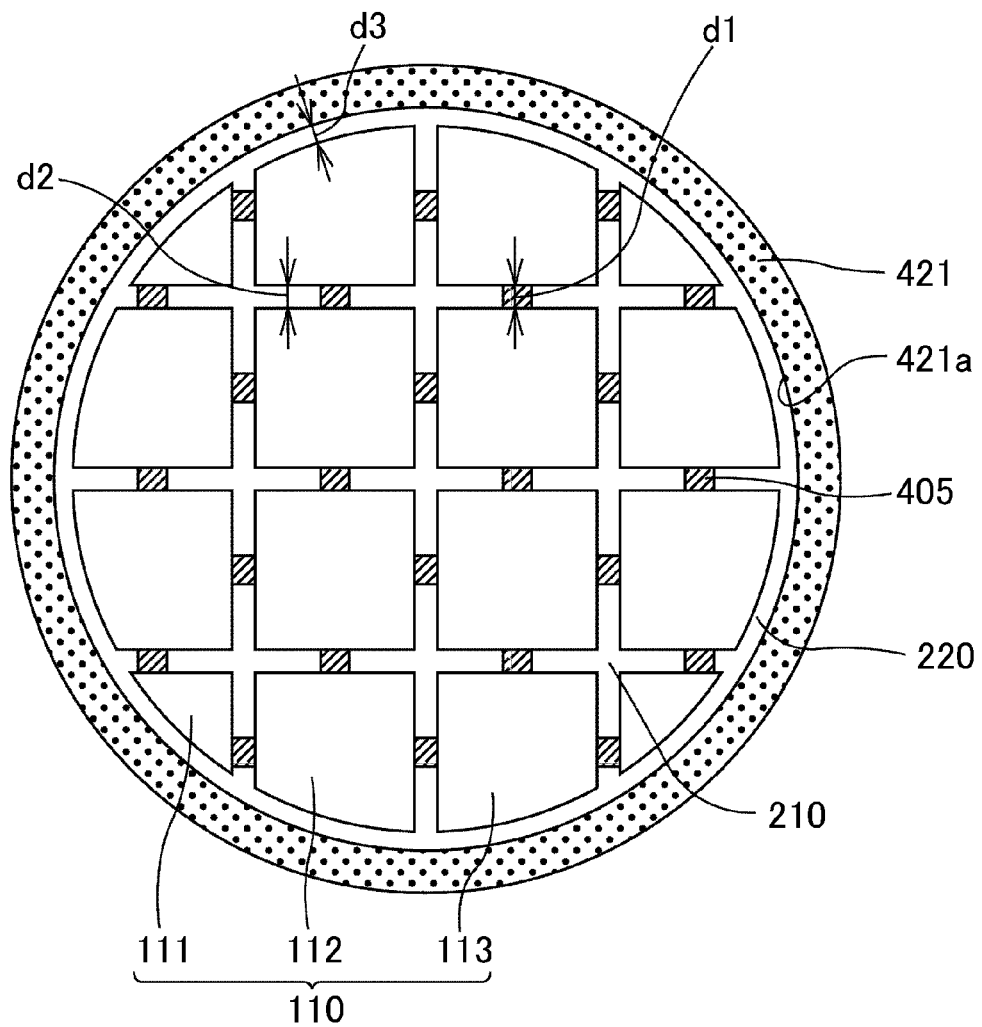
FIG. 12 is a cross-sectional view along the direction perpendicular to the longitudinal direction of honeycomb fired bodies, schematically illustrating the state where the honeycomb fired bodies are disposed inside a molding frame in a sixth embodiment of the present invention.

FIG. 12 is cross-sectional view along the direction perpendicular to the longitudinal direction of honeycomb fired bodies, schematically illustrating the state where the honeycomb fired bodies are disposed inside a molding frame in the sixth embodiment of the present invention.

In FIG. 12, the molding frame 421 is a porous metal molding frame, the entire of which is made of a porous metal.

In the sixth embodiment of the present invention, a porous metal molding frame 421 has strength high enough to fix the honeycomb fired bodies, and also includes a vent portion with air permeability.

Figure 13A:
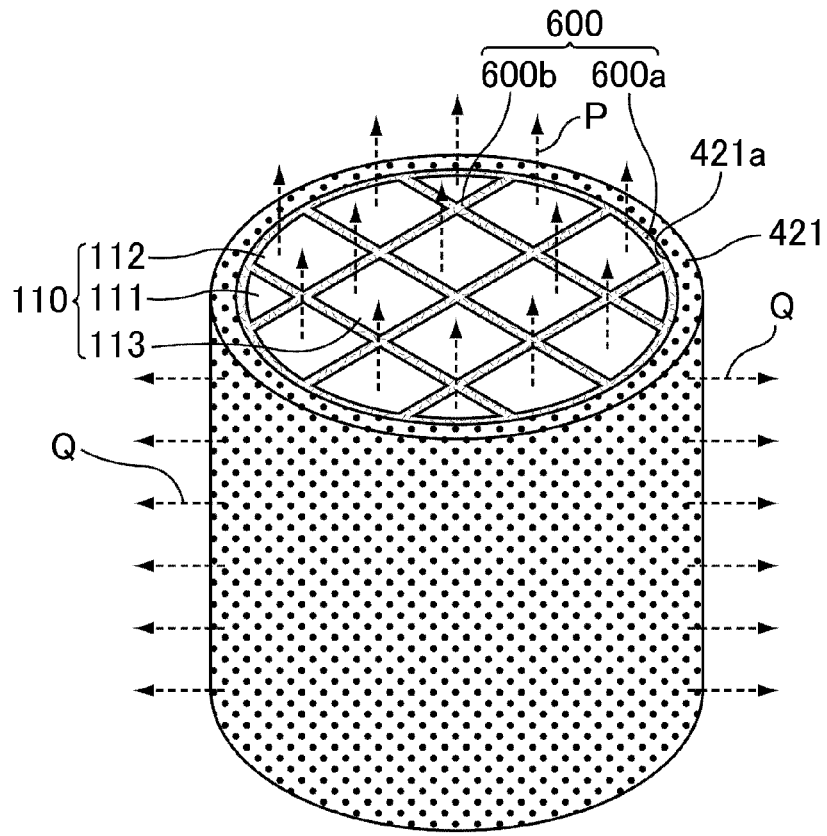
FIG. 13A is a perspective view schematically illustrating the state of the molding frame in drying (S5) in the sixth embodiment of the present invention.
Figure 13B:
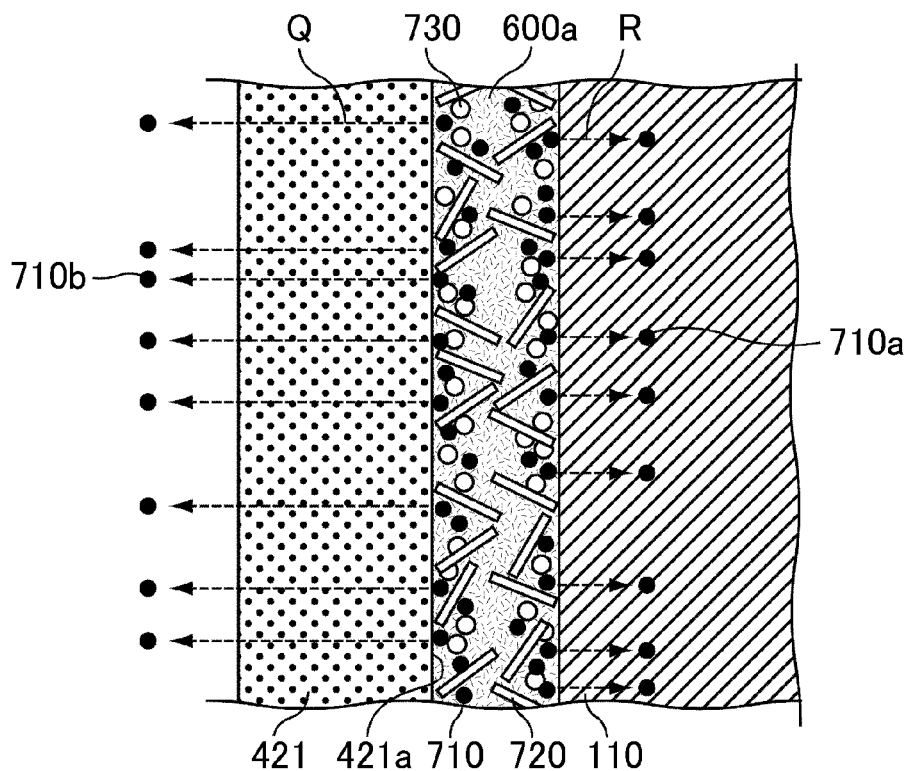
FIG. 13B is a cut-away cross-sectional view along the direction perpendicular to the longitudinal direction of the honeycomb fired bodies, schematically illustrating movement of moisture contained in a sealing material paste that is in contact with the inner face of the molding frame in the sixth embodiment of the present invention.

FIG. 13A is a perspective view schematically illustrating the state of the molding frame in drying (S5) in the sixth embodiment of the present invention. FIG. 13B is a cut-away cross-sectional view along the direction perpendicular to the longitudinal direction of the honeycomb fired bodies, schematically illustrating movement of moisture contained in a sealing material paste that is in contact with the inner face of the molding frame in the sixth embodiment of the present invention.

As illustrated in FIG. 13A and FIG. 13B, moisture 710 in the sealing material paste 600a becomes steam by heating, and steam 710a, which is part of the steam, moves to the honeycomb fired body 110 side as indicated by the arrow R, and then is discharged from the end face of the honeycomb fired body 110 to the outside. Steam 710b, which is part of the steam, moves to the arrow Q direction through the molding frame 421, and then is discharged to the outside.

Accordingly, also in the sixth embodiment of the present invention, bias of the movement direction of the moisture 710 contained in the sealing material paste 600a does not occur, so that generation of migration upon drying the sealing material paste tends to be suppressed, as in the first embodiment of the present invention.

In the present embodiment, the following effect as well as the effects (1), (3), and (4) mentioned in the first embodiment of the present invention can be exhibited.

(8) According to the method for manufacturing the honeycomb structure in accordance with the sixth embodiment of the present invention, air permeability tends to be provided by the porous metal molding frame.

Hereinafter, an example that more specifically discloses the sixth embodiment of the present invention will be mentioned. The present invention is not limited to only this example.

Example 6

In the present example 6, a honeycomb structure having a shape illustrated in FIG. 1 was prepared in the same manner as in example 1, except that a foam metal molding frame having the same configuration as in example 3 except for its inner diameter was used as a molding frame. The distance (corresponding to d3 in FIG. 12) between the combined honeycomb fired bodies and the molding frame was 0.925 mm.

The coat layer surface of the manufactured honeycomb structure was visually observed and touched by finger, which found that the coat layer surface had no floury texture. In addition, the coat layer was observed with SEM to reveal that the proportion of the inorganic particles present in the surface side of the coat layer was substantially equal to the proportion of the inorganic particles present in the honeycomb fired body side of the coat layer, and the proportion of the inorganic fibers present in the surface side of the coat layer was substantially equal to the proportion of the inorganic fibers present in the honeycomb fired body side of the coat layer, and that no migration in the coat layer was observed.

Seventh Embodiment

Hereinafter, a seventh embodiment, one embodiment of the method for manufacturing the honeycomb structure of the present invention, will be described.

In the present embodiment, both end faces of each of the honeycomb fired bodies are held to fix the honeycomb fired bodies in fixing (S3).

The honeycomb structure manufactured in the present embodiment has the same configuration as in the honeycomb structure in accordance with the first embodiment of the present invention, and therefore detail explanation thereof is omitted. Members whose configurations are substantially identical to those illustrated in the first embodiment of the present invention are labeled with identical referential numerals, and explanations thereof are omitted.

In the first embodiment of the present invention, upon combining the honeycomb fired bodies 110 into a substantially round pillar shape, the honeycomb fired bodies 110 are fixed with a spacer 405 as illustrated in FIG. 4. According to the present embodiment, the both end faces of the honeycomb fired bodies 110 are fixed with a fixing pin.

FIG. 14A, FIG. 14B, FIG. 14C, FIG. 14D, and FIG. 14E are views each explaining fixing the honeycomb fired bodies of the seventh embodiment of the present invention, and are cross-sectional views along the direction perpendicular to the longitudinal direction of the honeycomb fired bodies and each schematically illustrating arrangement of the honeycomb fired bodies disposed inside the molding frame. The molding frame is the molding frame 411 of the first embodiment of the present invention, and the paper 412 is disposed on the inner face side of the molding frame 411.

Figure 14A:
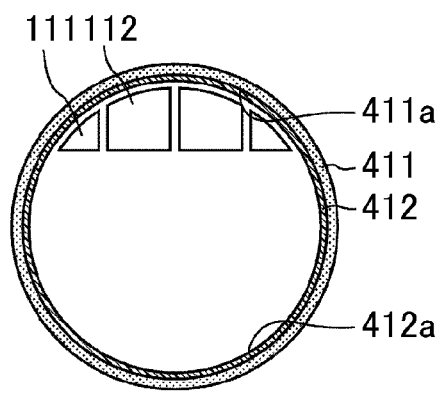
FIG. 14A, FIG. 14B, FIG. 14C, FIG. 14D, and FIG. 14E are views each explaining fixing honeycomb fired bodies of a seventh embodiment of the present invention, and are cross-sectional views along the direction perpendicular to the longitudinal direction of the honeycomb fired bodies and each schematically illustrating arrangement of the honeycomb fired bodies disposed inside the molding frame.

In FIG. 14A, two pieces of the honeycomb fired bodies 111 and two pieces of the honeycomb fired bodies 112 are disposed inside the molding frame 411 on the inner face 411a side of which the paper 412 is disposed, in such a manner that the two pieces of the honeycomb fired bodies 112 are interposed between one honeycomb fired body 111 and the other honeycomb fired body 111. The honeycomb fired bodies 111 and the honeycomb fired bodies 112 are disposed with a certain space between one another, and the honeycomb fired bodies 111 and the honeycomb fired bodies 112 are disposed with a certain space from the inner face 411a of the molding frame 411. Into the spaces, a sealing material paste is to be filled in the subsequent step.

The honeycomb fired bodies 111 and 112 are transported and disposed, for example, with a transport member provided with a robot armor a placement face on which four honeycomb fired bodies can be placed at once, and the like.

Figure 14B:
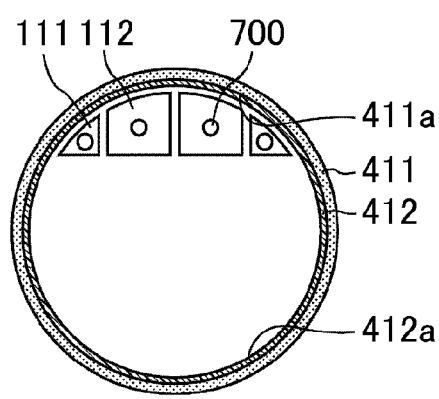

Next, as illustrated in FIG. 14B, the both end faces of the honeycomb fired bodies 111 and the honeycomb fired bodies 112, which are disposed inside the molding frame 411, are fixed with a fixing pin 700 as a holding member. The fixing pin 700 holds the honeycomb fired bodies 111 and the honeycomb fired bodies 112 in such a manner that the both end faces of the honeycomb fired bodies 111 and the honeycomb fired bodies 112 are positioned on the same plane.

Figure 14C:
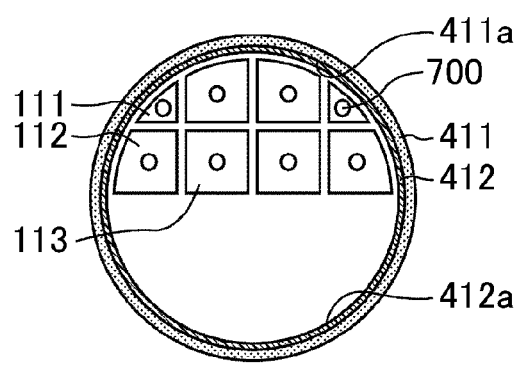

Next, as illustrated in FIG. 14C, two pieces of the honeycomb fired bodies 112 and two pieces of the honeycomb fired bodies 113 are disposed on the inner face side of the molding frame 411 in such a manner that the two pieces of the honeycomb fired bodies 113 are interposed between one honeycomb fired body 112 and the other honeycomb fired body 112. Then, as mentioned in the above, the both end faces of the honeycomb fired bodies 112 and the honeycomb fired bodies 113 are fixed with the fixing pin 700.

Figure 14D:
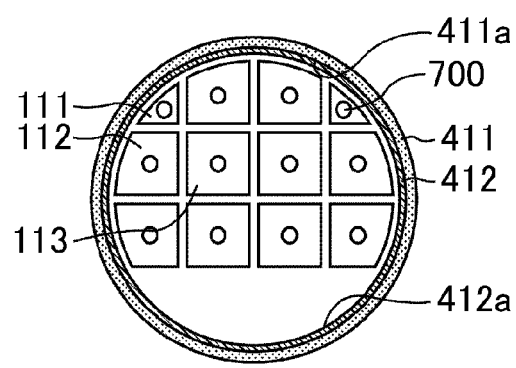
Figure 14E:
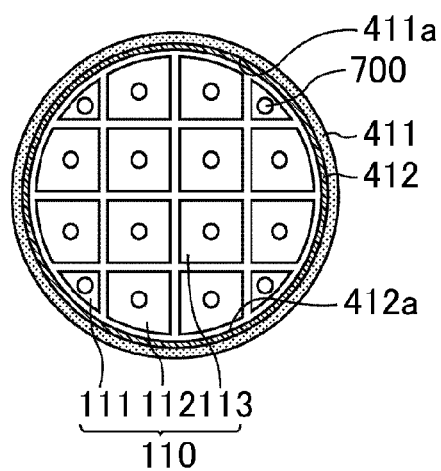

Next, as illustrated in FIG. 14D, two pieces of the honeycomb fired bodies 112 and two pieces of the honeycomb fired bodies 113 are disposed in the above manner and then fixed with the fixing pin 700. Further, as illustrated in FIG. 14E, two pieces of the honeycomb fired bodies 111 and two pieces of the honeycomb fired bodies 112 are disposed in the above manner and then fixed with the fixing pin 700.

Thus, 16 pieces of the honeycomb fired bodies 111, the honeycomb fired bodies 112, and the honeycomb fired bodies 113 that configure the honeycomb structure can be disposed in parallel to one another in the longitudinal direction in such a manner that the both end faces thereof configure the same plane.

The above explanation has been given as to the method of disposing a plurality of the honeycomb fired bodies 110 at specific positions and holding the honeycomb fired bodies 110 by fixing the both end faces of the honeycomb fired bodies 110 with the fixing pin 700 as a holding member. The combined honeycomb fired bodies 110 may not be necessarily held by being fixed with a holding member, and may be held by being caught by a holding member from the both end faces thereof.

Further, although the above description takes the molding frame and the member including the vent portion of the first embodiment of the present invention as an example of the molding frame and the member, the present embodiment can be applied to the molding frame and/or the member including the vent portion of another embodiment.

In the seventh embodiment of the present invention, the following effect as well as the effects (1) to (4) mentioned in the first embodiment of the present invention can be exhibited.

(9) According to the method for manufacturing the honeycomb structure in accordance with the seventh embodiment of the present invention, in the fixing, the both end faces of the honeycomb fired bodies are held to fix the honeycomb fired bodies, and therefore, the honeycomb fired bodies can be easily held in a specific shape.

The seventh embodiment of the present invention mentioned above employs a holding member that is so configured to hold each of the honeycomb fired bodies, but the holding member may be so configured to hold a plurality of the honeycomb fired bodies together against the end faces of the honeycomb fired bodies.

Eighth Embodiment

Hereinafter, an eighth embodiment, one embodiment of the method for manufacturing the honeycomb structure of the present invention, will be described.

The first to sixth embodiments of the present invention have been each explained with reference to the specific example of the vent portion. In addition to those exemplified vent portions, a vent portion formed by a metal member with a plurality of recessed portions and/or projective portions can be used as the vent portion in the present invention. The present embodiment is mentioned with reference to an example case where an inner face of a molding frame including a plurality of recessed portions formed on the inner face thereof includes a vent portion.

The honeycomb structure manufactured in the present embodiment has the same configuration as in the honeycomb structure in accordance with the first embodiment of the present invention, and therefore detail explanation thereof is omitted. Members whose configurations are substantially identical to those illustrated in the first embodiment of the present invention are labeled with identical referential numerals, and explanations thereof are omitted.

Figure 15:
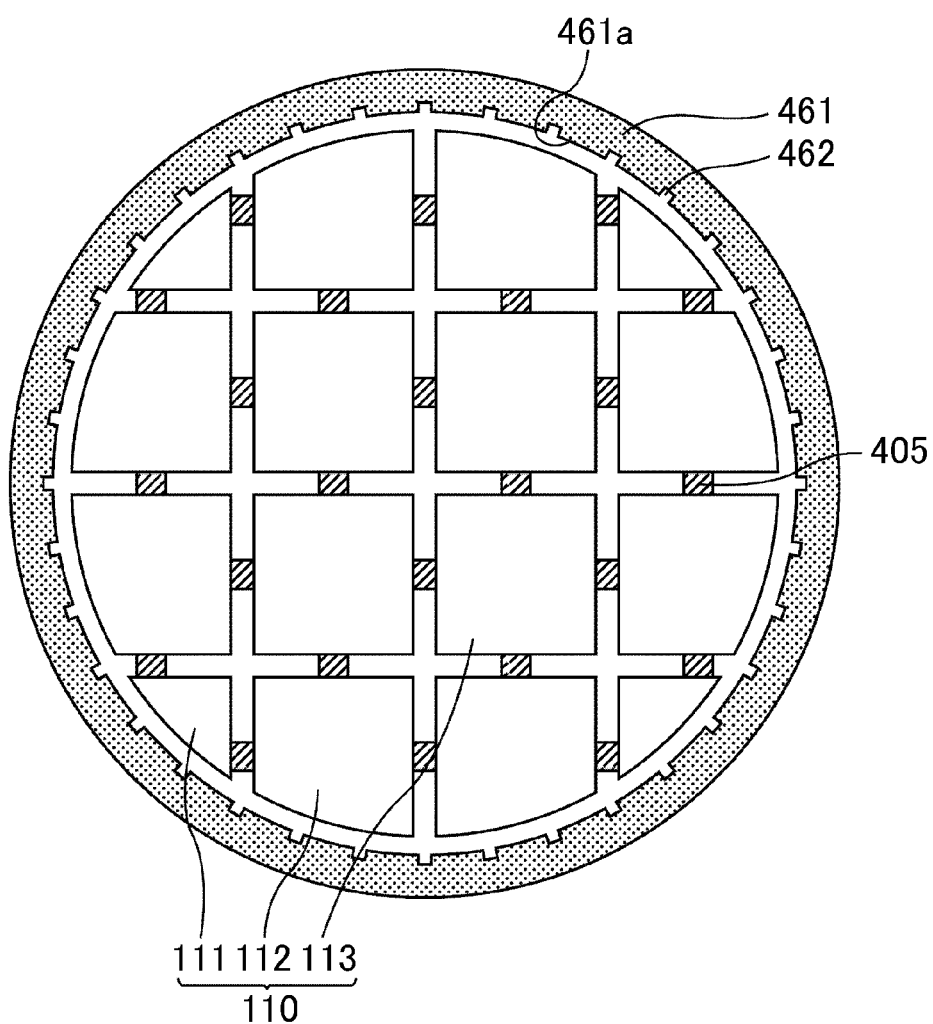
FIG. 15 is a cross-sectional view along the direction perpendicular to the longitudinal direction of honeycomb fired bodies, schematically illustrating the state where the honeycomb fired bodies are disposed inside a molding frame in an eighth embodiment of the present invention.

FIG. 15 is a cross-sectional view along the direction perpendicular to the longitudinal direction of the honeycomb fired bodies, schematically illustrating the state where the honeycomb fired bodies are disposed inside the molding frame in the eighth embodiment of the present invention.

In FIG. 15, a plurality of recessed portions 462 are formed on an inner face 461a of a molding frame 461 made of a dense metal. The depth and width of the recessed portions 462 are not especially limited, and may be appropriately determined depending on desired air permeability. Examples of the metal material for the molding frame 461 include copper, nickel, stainless steel, alloys containing at least one of copper, nickel, and stainless steel, and the like.

Although the molding frame 461 is made of a dense metal with no air permeability, the plurality of recessed portions 462 are formed on the inner face of the molding frame 461, and therefore the molding frame 461 tends to let steam into the plurality of recessed portions 462 upon drying the sealing material paste. Specifically, the plurality of recessed portions 462 can form a vent portion.

Also in use of the molding frame 460 having the above configuration, bias of the movement direction of the moisture contained in the seal material paste tends not to occur, so that generation of migration upon drying the sealing material paste tends to be suppressed, as in the first to sixth embodiments of the present invention.

In the above explanation, recessed portions being formed on the inner face of the molding frame is exemplified, but the present embodiment is not limited thereto. Instead of the recessed portions, projective portions may be formed on the inner face of the molding frame. Alternatively, both of recessed portions and projective portions may be formed on the inner face of the molding frame. Also in these configurations, spaces are defined between the sealing material paste for forming the coat layer and the inner face of the molding frame by the recessed portions and the projective portions, and these spaces can contribute to movement of moisture contained in the sealing material paste.

Since the molding frame in accordance with the eighth embodiment of the present invention includes recessed portions and/or projective portions formed on the inner face thereof, the coat layer surface in the obtained honeycomb structure tends to have recessed portions and/or projective portions.

When the honeycomb structure is used in an exhaust gas-purifying apparatus, for example, a holding sealing material (mat formed by inorganic fibers) is wound around the peripheral face of the coat layer, and then the honeycomb structure with the holding sealing material is inserted into a metal case to be used. In this case, when the coat layer surface has recessed portions and/or projective portions as mentioned above, the holding sealing member gets caught in the recessed portions or fitted into the projective portions. This makes it difficult for the honeycomb structure to be gotten out of the metal case in use.

When the projective portions are formed on the coat layer surface, the coat layer surface may be flattened by polishing, and the like.

In the eighth embodiment of the present invention, a paper member, a nonwoven fabric member, a mesh member, or the like, may be disposed on the inner face side of the molding frame that includes recessed and projective portions formed on the inner face thereof as mentioned above, as in the first to fifth embodiments of the present invention.

In the present embodiment, the following effect as well as the effects (1) to (4) mentioned in the first embodiment of the present invention can be exhibited.

(10) According to the method for manufacturing the honeycomb structure in accordance with the eighth embodiment of the present invention, the vent portion is formed by a metal member with a plurality of recessed portions and/or projective portions formed on the inner face of the metal member, and therefore, air permeability tends to be provided by the plurality of recessed portions and/or projective portions.

Ninth Embodiment

Hereinafter, a ninth embodiment, one embodiment of the method for manufacturing the honeycomb structure of the present invention, will be described.

The above embodiments of the present invention employ an integrally-formed molding frame as the molding frame for fixing the combined honeycomb fired bodies. The ninth embodiment of the present invention explains a molding frame that is separable into two members.

Figure 16:
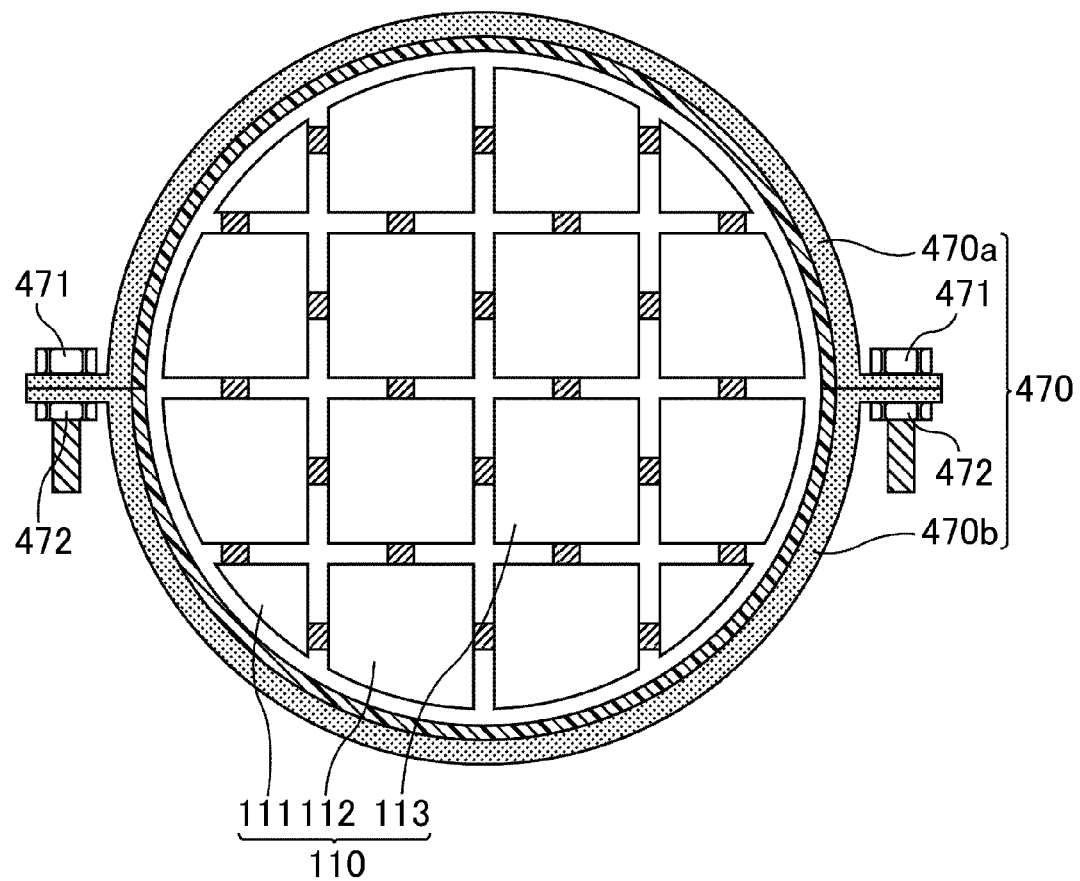
FIG. 16 is a cross-sectional view along the direction perpendicular to the longitudinal direction of honeycomb fired bodies, schematically illustrating the state where the honeycomb fired bodies are disposed inside a molding frame that is separable into two molding frame members in a ninth embodiment of the present invention.

FIG. 16 is a cross-sectional view along the direction perpendicular to the longitudinal direction of the honeycomb fired bodies, schematically illustrating the state where the honeycomb fired bodies are disposed inside a molding frame that is separable into two molding frame members in a ninth embodiment of the present invention.

In FIG. 16, a molding frame 470 is constituted by a pair of a molding frame member 470a and a molding frame member 470b.

In fixing (S3), honeycomb fired bodies are combined into a desired shape inside the molding frame member 470a. Then, the molding frame member 470a is assembled with the molding frame member 470b, and the both members are fixed to each other with a bolt 471 and a nut 472.

When the molding frame 470 with such a configuration is used, the molding frame member 470a and the molding frame member 470b can be separated from each other after the sealing material paste is solidified to some extent by, for example, heating. Thus, the honeycomb structure 100 can be easily released from the molding frame. Then, the obtained honeycomb structure is transferred to another place, and then the sealing material paste can be further dried at a specific temperature.

In the above explanation, the molding frame that is separable into two members is exemplified, but the present embodiment is not limited thereto. Specifically, the molding frame is not especially limited provided that the combined honeycomb fired bodies are held inside the molding frame, and various molding frames, e.g. molding frame that can be optionally separated into a plurality of members, can be applied. The way of separating the molding frame is not especially limited. The molding frame may be separated into a plurality of members along the direction substantially perpendicular to or substantially parallel to the longitudinal direction of the honeycomb structure. The material for the molding frame may be a dense metal or a porous metal.

In the present embodiment, the following effect as well as the effects (1) to (4) mentioned in the first embodiment of the present invention can be exhibited.

(11) According to the method for producing the honeycomb structure in accordance with the ninth embodiment of the present invention, the molding frame is separable into a plurality of members. Therefore, this molding frame is disassembled, and the manufactured honeycomb structure tends to be taken out before the sealing material paste is completely solidified. This tends to reduce the time taken for cooling the heated honeycomb structure. As a result of this, the drying time of the sealing material paste tends to be decreased, which more likely lead to increase in productivity of the honeycomb structure.

Other Embodiments

In both the dense metal molding frame and the porous metal molding frame, the molding frame of the embodiments of the present invention desirably includes a coating layer on the inner face thereof. When the molding frame includes a coating layer such as fluorine resins formed thereon, the frame-releasability of the honeycomb structure can be increased. Further, the coating layer has better releasability, and therefore, in the case where a member including a vent portion is further provided on the inner face side of the molding frame, the member including the vent portion can be easily separated when it must be replaced by clogging and the like, and thus, workability can be improved. In addition, the coating layer may be partially formed so as not to fill all of the pores of the porous metal.

In addition, the molding frame in the embodiments of the present invention is not especially limited to only the dense metal molding frame or the porous metal molding frame, and may be, for example, a molding frame in which a dense metal layer constituting the outer face and a porous metal layer constituting the inner face are integrally formed. The ratio of the dense metal layer to the porous metal layer may be suitably determined by taking into consideration the strength as a molding frame and the air permeability of the porous metal layer that includes a vent portion.

In the embodiments of the present invention, the member including a vent portion is not limited to the member including the vent portion mentioned in the above embodiments, and various members including the vent portions can be used. For example, the member including the vent portion can be constituted by forming a porous resin layer or a porous carbon layer instead of disposing a paper member, a nonwoven fabric member, or a mesh member, on the inner face side of the molding frame. Further, the member including the vent portion can be constituted by a combination of any two or more of a paper member, a nonwoven fabric member, a mesh member, a porous resin layer, and a porous carbon layer. The combination and arrangement of these members including the vent portions are not especially limited, and may be suitably determined by taking into consideration of air permeability, releasability, pore diameter, and the like.

The porous resin layer is not especially limited, but is formed by at least one selected from fluorine resins such as polytetrafluoroethylene, polychlorotrifluoroethylene, ethylene fluoride resins, and polyvinylidene fluoride, and polypropylene. The porosity, pore diameter, and the like of the porous resin layer can be suitably determined.

As one example of the porous resin layer, a polypropylene film with an average pore diameter of about 0.3 µm (available from Sumitomo 3M Limited, microporous film) is mentioned. This polypropylene film is a porous film composed of polypropylene and an organic filler, and has both of air permeability and waterproof property. Further, a tetrafluorinated ethylene resin porous film with an average pore diameter of about 0.6 µm (available from NITTO DENKO CORP., trade name: TEMISH) is mentioned.

The porous resin layer can be formed, for example, by applying the above resin to the inner face of the porous metal molding frame. In this case, the porous resin layer is integrally formed on the inner face of the molding frame, and therefore both the porous metal frame and the porous resin layer together can be regarded as a molding frame.

The shape of the honeycomb structure obtained by the method for manufacturing the honeycomb structure of the present invention is not especially limited to a substantially round pillar shape illustrated in FIG. 1, and may be any pillar shape such as a substantially cylindroid shape, a substantially pillar shape with a racetrack end face, a substantially polygonal pillar shape.

Further, the number of the honeycomb fired bodies that configure the honeycomb structure is not limited to 16 as in the above embodiment of the present invention, and may be smaller or larger than 16.

The above embodiments of the present invention have been explained with reference to an example case where the honeycomb fired bodies are combined inside the molding frame, but the present invention is not especially limited thereto. A plurality of honeycomb fired bodies are combined into a specific shape, and then both end faces of the honeycomb fired bodies are held and fixed with a holding member and the like, and then, the combined honeycomb fired bodies may be disposed inside the molding frame.

The porosity of the honeycomb fired body prepared by the method for manufacturing the honeycomb structure according to the embodiments of the present invention is desirably from about 30% to about 70% in use as a honeycomb filter. When the honeycomb fired body has such a porosity, the strength of the honeycomb structure tends to be maintained, and resistance upon passage of exhaust gases through the cell wall tends to be kept low. A porosity of the honeycomb fired body of about 30% or more tends not to cause clogging in the cell wall, while a porosity of the honeycomb fired body of about 70% or less tends not to cause a decrease in strength of the honeycomb fired body with the result that the honeycomb fired body tends not to be broken.

Here, the porosity of the honeycomb fired body can be measured through known methods such as a measuring method using a mercury porosimeter.

The cell density in the cross section perpendicular to the longitudinal direction of the honeycomb fired body is not particularly limited. A desirable lower limit is about 31.0 pcs/cm$^2$ (about 200 pcs/in$^2$) and a desirable upper limit is about 93.0 pcs/cm$^2$ (about 600 pcs/in$^2$). A more desirable lower limit is about 38.8 pcs/cm$^2$ (about 250 pcs/in$^2$) and a more desirable upper limit is about 77.5 pcs/cm$^2$ (about 500 pcs/in$^2$).

The main component of the material for the honeycomb fired body is not limited to silicon carbide, and may be nitride ceramics such as aluminum nitride, silicon nitride, boron nitride, and titanium nitride; carbide ceramics such as zirconium carbide, titanium carbide, tantalum carbide, and tungsten carbide; a complex of a metal and a nitride ceramic; a complex of a metal and a carbide ceramic, and the like.

Further, a ceramic raw material such as a silicon-containing ceramic, in which metal silicon is mixed with the above-described ceramics, and a ceramic joined by silicon or a silicate compound may also be used as the material for the honeycomb fired body. Among these, silicon carbide or silicon-containing ceramic excellent in mechanical strength is desirable as the material for the honeycomb fired body.

The above embodiments of the present invention have explained the method for manufacturing the honeycomb structure that is used as an exhaust gas-purifying filter including cells sealed with a sealing material at either one end thereof, but the honeycomb structure in the embodiments of the present invention is not especially limited thereto. The honeycomb structure may have cells whose both ends are not sealed with a sealing material. Such a honeycomb structure can be used as a catalyst supporting carrier that supports a catalyst on the cell wall.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for manufacturing a honeycomb structure, comprising:
   extrusion-molding honeycomb molded bodies each having cell walls extending along a longitudinal direction of the honeycomb molded bodies to define cells, the cell walls including a peripheral cell wall formed at a peripheral portion of the honeycomb molded bodies;
   firing the honeycomb molded bodies to form pillar-shaped honeycomb fired bodies;
   providing a molding frame having a vent portion with air permeability;
   fixing the honeycomb tired bodies in the molding frame, or fixing the honeycomb fired bodies in the molding frame to form another vent portion with air permeability on an inner face of the molding frame;
   disposing a member having the another vent portion with air permeability on an inner face side of the molding frame;
   filling a gap between the honeycomb fired bodies and a gap between the molding frame and the honeycomb fired bodies with a sealing material paste, the sealing material paste comprising inorganic particles and/or inorganic fibers; and
   drying the sealing material paste to solidify the sealing material paste and to form an adhesive layer between the honeycomb fired bodies and a coat layer on a periphery of a ceramic block, the sealing material paste being in contact with at least a part of the vent portion or the another vent portion daring the drying, the ceramic block being formed by the honeycomb fired bodies combined with one another with the adhesive layer.

2. The method for manufacturing the honeycomb structure according to claim 1,
   wherein
   the molding frame comprises one of a molding frame made of a dense metal, a molding frame made of a porous metal, and a molding frame made of a dense metal including a plurality of recessed portions and/or projective portions formed on an inner face of the molding frame.

3. The method for manufacturing the honeycomb structure according to claim 2,
   wherein
   the porous metal has a pore diameter that is larger than an average particle diameter of the inorganic particles and an average fiber diameter of the inorganic fibers contained in the sealing material paste, and
   a paper member including the another vent portion with an average pore diameter smaller than the pore diameter of the porous metal is disposed on the inner face side of the molding frame made of the porous metal.

4. The method for manufacturing the honeycomb structure according to claim 1,
   wherein
   the member disposed on the inner face side of the molding frame comprises a paper member.

5. The method for manufacturing the honeycomb structure according to claim 4,
   wherein
   the paper member comprises a silicon-treated paper member.

6. The method for manufacturing the honeycomb structure according to claim 5,
   wherein
   the another vent portion of a silicon-treated part of the silicon-treated paper member has an average pore diameter of about 20 μm to about 50 μm.

7. The method for manufacturing the honeycomb structure according to claim 5,
   wherein the silicon-treated paper member comprises craft paper or glassine paper.

8. The method for manufacturing the honeycomb structure according to claim 4,
   wherein
   the member including the another vent portion is disposed on an entire surface of the inner face side of the molding frame to be in contact with the sealing material paste that is to form the coat layer.

9. The method for manufacturing the honeycomb structure according to claim 4,
   wherein
   the paper member has a thickness of about 0.06 mm to about 0.12 mm.

10. The method for manufacturing the honeycomb structure according to claim 4,
    wherein
    an average pore diameter of the another vent portion of the paper member is smaller than an average particle diameter of the inorganic particles contained in the sealing material paste.

11. The method for manufacturing the honeycomb structure according to claim 4,
    wherein
    the paper member comprises craft paper or glassine paper.

12. The method for manufacturing the honeycomb structure according to claim 1,
    wherein
    the vent portion or the another vent portion has an average pore diameter of about 0.1 μm to about 50 μm.

13. The method for manufacturing the honeycomb structure according to claim 1,
    wherein
    the molding frame or the member disposed on the inner face side of the molding frame has an air permeability of about 0.05 cc/cm²/sec or more.

14. The method for manufacturing the honeycomb structure according to claim 13,
    wherein
    the molding frame or the member disposed on the inner face side of the molding frame has the air permeability that is from about 0.05 cc/cm²/sec to about 100 cc/cm²/sec.

15. The method for manufacturing the honeycomb structure according to claim 13,
wherein
the molding frame or the member disposed on the inner face side of the molding frame has the air permeability that is in a range from about 1 cc/cm$^2$/sec to about 100 cc/cm$^2$/sec.

16. The method for manufacturing the honeycomb structure according to claim 13,
wherein
the molding frame or the member disposed on the inner face side of the molding frame has the air permeability that is in a range from about 5 cc/cm$^2$/sec to about 100 cc/cm$^2$/sec.

17. The method for manufacturing the honeycomb structure according to claim 1,
wherein
both the molding frame and the member disposed on the inner face side of the molding frame include the vent portion or the another vent portion,
the molding frame is made of a porous metal, and
the member comprises a paper member or nonwoven fabric member.

18. The method for manufacturing the honeycomb structure according to claim 1,
wherein
the member disposed on the inner face side of the molding frame includes the another vent portion,
the member comprises a paper member or nonwoven fabric member, and
the molding frame is made of a dense metal.

19. The method for manufacturing the honeycomb structure according to claim 1,
wherein
the member disposed on the inner face side of the molding frame has a thickness that is from about 1/10 to about 3/4 of a thickness of the molding frame.

20. The method for manufacturing the honeycomb structure according to claim 1,
wherein
the member disposed on the inner face side of the molding frame has a thickness that is in a range from about 1/5 to about 1/2 of a thickness of the molding frame.

21. The method for manufacturing the honeycomb structure according to claim 1,
wherein
the molding frame is separable into a plurality of members, and
in the fixing, the plurality of members are integrated together to be used.

22. The method for manufacturing the honeycomb structure according to claim 1,
wherein
in the fixing, the honeycomb fired bodies are fixed using a spacing member to keep the honeycomb fired bodies at regular spaces.

23. The method for manufacturing the honeycomb structure according to claim 1,
wherein
in the fixing, both end faces of each of the honeycomb fired bodies are held to fix the honeycomb fired bodies.

24. The method for manufacturing the honeycomb structure according to claim 1,
wherein
in the drying, the sealing material paste is dried in such a manner that a proportion of the inorganic particles present or a proportion of the inorganic fibers present in a surface side of the coat layer is substantially equal to a proportion of the inorganic particles present or a proportion of the inorganic fibers present in a ceramic block side of the coat layer, respectively.

25. The method for manufacturing the honeycomb structure according to claim 1,
wherein
each of the honeycomb fired bodies comprises silicon carbide or silicon-containing ceramic.

26. The method for manufacturing the honeycomb structure according to claim 1,
wherein
each of the cells is sealed with a sealing material at either one end of each of the cells.

27. The method for manufacturing the honeycomb structure according to claim 1,
wherein
each of the cells is not sealed with a sealing material at both ends of each of the cells.

28. The method for manufacturing the honeycomb structure according to claim 1,
wherein
the member disposed on the inner face side of the molding frame comprises a nonwoven fabric member.

29. The method for manufacturing the honeycomb structure according to claim 28,
wherein
the nonwoven fabric member comprises a polyester nonwoven fabric member containing polyester fibers.

30. The method for manufacturing the honeycomb structure according to claim 28,
wherein
the nonwoven fabric member comprises polyester, acryl, polypropylene, polyethylene, polyester, polyolefin, aramid, vinylon, or rayon.

31. The method for manufacturing the honeycomb structure according to claim 1,
wherein
the member disposed on the inner face side of the molding frame comprises a mesh member.

32. The method for manufacturing the honeycomb structure according to claim 31,
wherein
the mesh member comprises a metal mesh member.

33. The method for manufacturing the honeycomb structure according to claim 32,
wherein
the metal mesh member comprises meshes of stainless steel, nickel, titanium, copper, or zinc.

34. The method for manufacturing the honeycomb structure according to claim 31,
wherein
the mesh member comprises a resin mesh member.

35. The method for manufacturing the honeycomb structure according to claim 34,
wherein
the resin mesh member comprises meshes of polyamide, polyethylene terephthalate, polypropylene, polyethylene, polyphenylene sulfide, or fluorine resins.

36. The method for manufacturing the honeycomb structure according to claim 1,
wherein
the member disposed on the inner face side of the molding frame comprises a porous resin layer.

37. The method for manufacturing the honeycomb structure according to claim 36,
wherein the porous resin layer comprises at least one of fluorine resins and polypropylene.

38. The method for manufacturing the honeycomb structure according to claim 36,
wherein
the porous resin layer comprises at least one of fluorine resins and polypropylene.

39. The method for manufacturing the honeycomb structure according to claim 38,
wherein
the fluorine resin comprises polytetrafluoroethylene, polychlorotrifluoroethylene, ethylene fluoride, ethylene tetrafluoride, or polyvinylidene fluoride.

40. The method for manufacturing the honeycomb structure according to claim 1,
wherein
the member disposed on the inner face side of the molding frame comprises a porous carbon layer.

\* \* \* \* \*

UNITED STATES PATENT AND TRADEMARK OFFICE
CERTIFICATE OF CORRECTION

PATENT NO. : 8,936,747 B2
APPLICATION NO. : 13/094843
DATED : January 20, 2015
INVENTOR(S) : Kazuya Naruse, Tomohiro Takano and Hideki Sugino Page 1 of 1

It is certified that error appears in the above-identified patent and that said Letters Patent is hereby corrected as shown below:

IN THE CLAIMS:

Column 41, line 34, "tired" should be changed to --fired--

Column 41, line 51, "daring" should be changed to --during--

Signed and Sealed this
Ninth Day of June, 2015

Michelle K. Lee
*Director of the United States Patent and Trademark Office*